(12) United States Patent
Kanai et al.

(10) Patent No.: US 6,349,173 B1
(45) Date of Patent: Feb. 19, 2002

(54) CAMERA WITH MOTOR-DRIVEN LENS BARREL

(75) Inventors: Masaharu Kanai; Ko Aosaki; Hiroshi Soma; Mutsumi Naruse; Toshihiko Izaki; Yukitaka Takeshita, all of Saitama; Masao Nakamori; Tetsuo Sakamoto, both of Tokyo, all of (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/739,284

(22) Filed: Dec. 19, 2000

Related U.S. Application Data

(62) Division of application No. 09/353,143, filed on Jul. 14, 1999, now Pat. No. 6,208,809.

(30) Foreign Application Priority Data

| Jul. 17, 1998 | (JP) | 10-202548 |
| Sep. 10, 1998 | (JP) | 10-256496 |
| Sep. 10, 1998 | (JP) | 10-256678 |
| Sep. 10, 1998 | (JP) | 10-256683 |
| Sep. 14, 1998 | (JP) | 10-260145 |

(51) Int. Cl.⁷ .................................................. G03B 3/10
(52) U.S. Cl. ........................... 396/90; 396/131; 396/280
(58) Field of Search ............................... 396/131, 137, 396/349, 90, 280, 129, 103

(56) References Cited

U.S. PATENT DOCUMENTS

| 4,182,555 A | * 1/1980 | Imura et al. ................. 396/103 |
| 4,671,639 A | 6/1987 | Kodaira et al. ............... 396/132 |
| 4,769,664 A | 9/1988 | Namai et al. .................. 396/90 |
| 5,218,391 A | 6/1993 | Kanai et al. ................... 396/40 |
| 5,313,244 A | 5/1994 | Arai ............................. 396/132 |

FOREIGN PATENT DOCUMENTS

| JP | 244271 | 11/1990 |
| JP | 4194829 | 7/1992 |
| JP | 9236854 | 9/1997 |

* cited by examiner

Primary Examiner—W. B. Perkey
(74) Attorney, Agent, or Firm—Young & Thompson

(57) ABSTRACT

A camera has a movable lens barrel that is stowed in a camera body while the camera is inactive, and is protruded from the camera body to a near range focusing position or a far range focusing position by rotating a drive ring in one direction. The movable barrel returns to the stowed position by rotating the drive ring further in the same direction, because of a cam mechanism interconnecting the drive ring with the movable barrel. To rotate the drive ring, a rotational power of a motor in a first direction is transmitted to the drive ring through a clutch mechanism. The clutch mechanism is switched over according to the rotational direction of the motor and transmits a rotational power of the motor in a second direction to another mechanism. A controller controls driving the motor in response to signals entered through manually operated members, including a power switch, a shutter button and a zone selector, with reference to detection signals from a barrel position detector.

2 Claims, 33 Drawing Sheets

F I G. 1 0
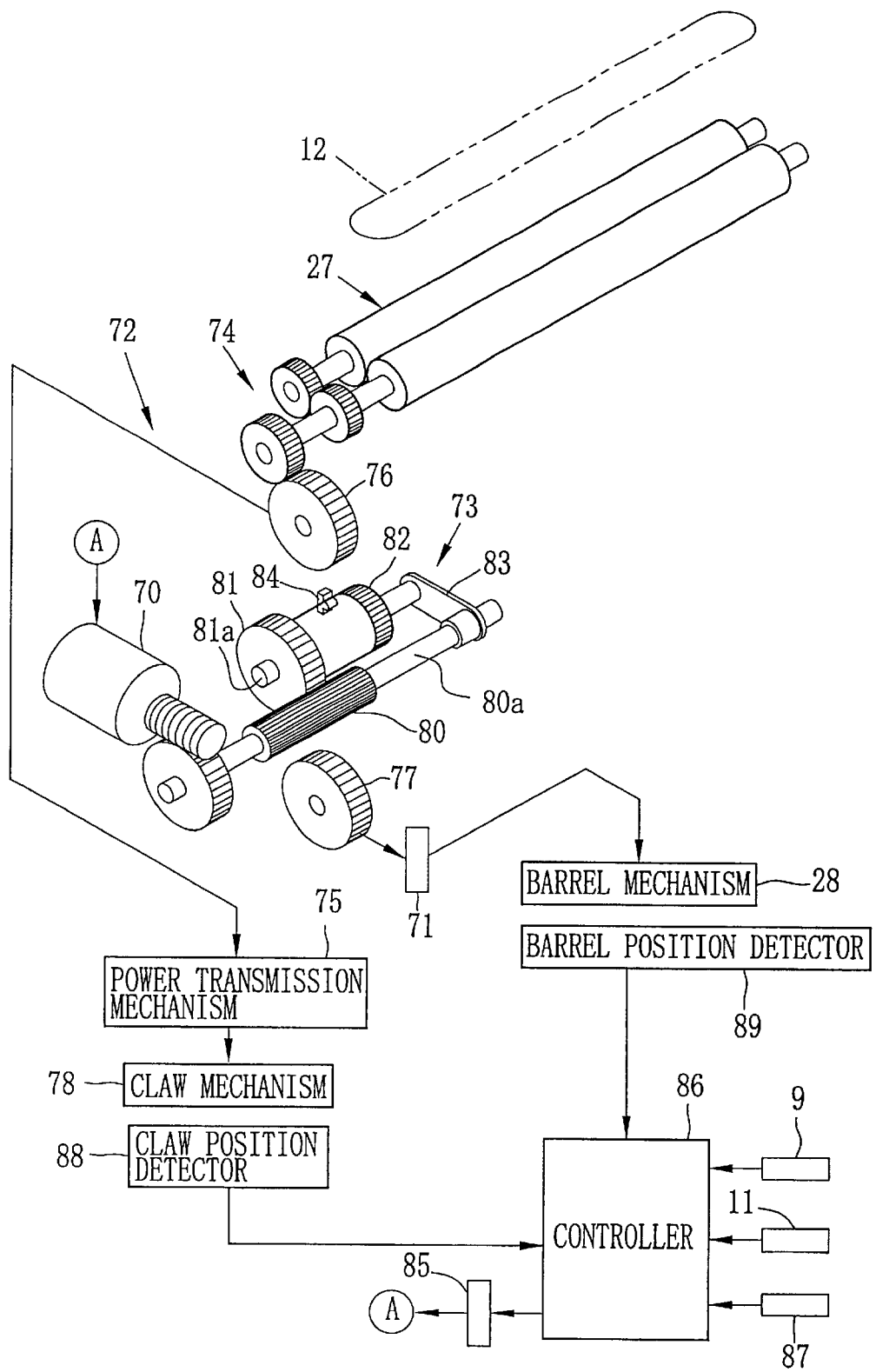

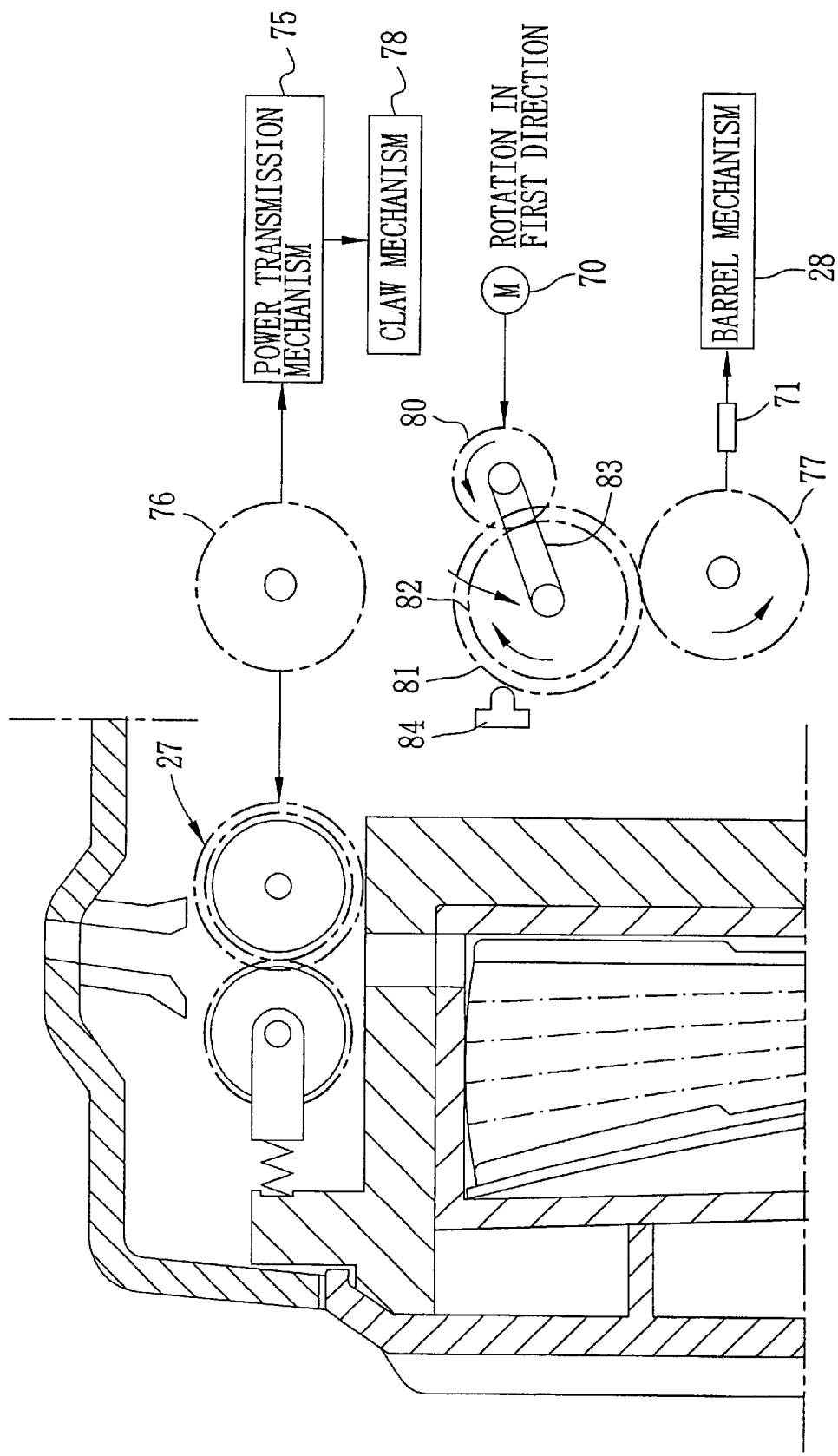

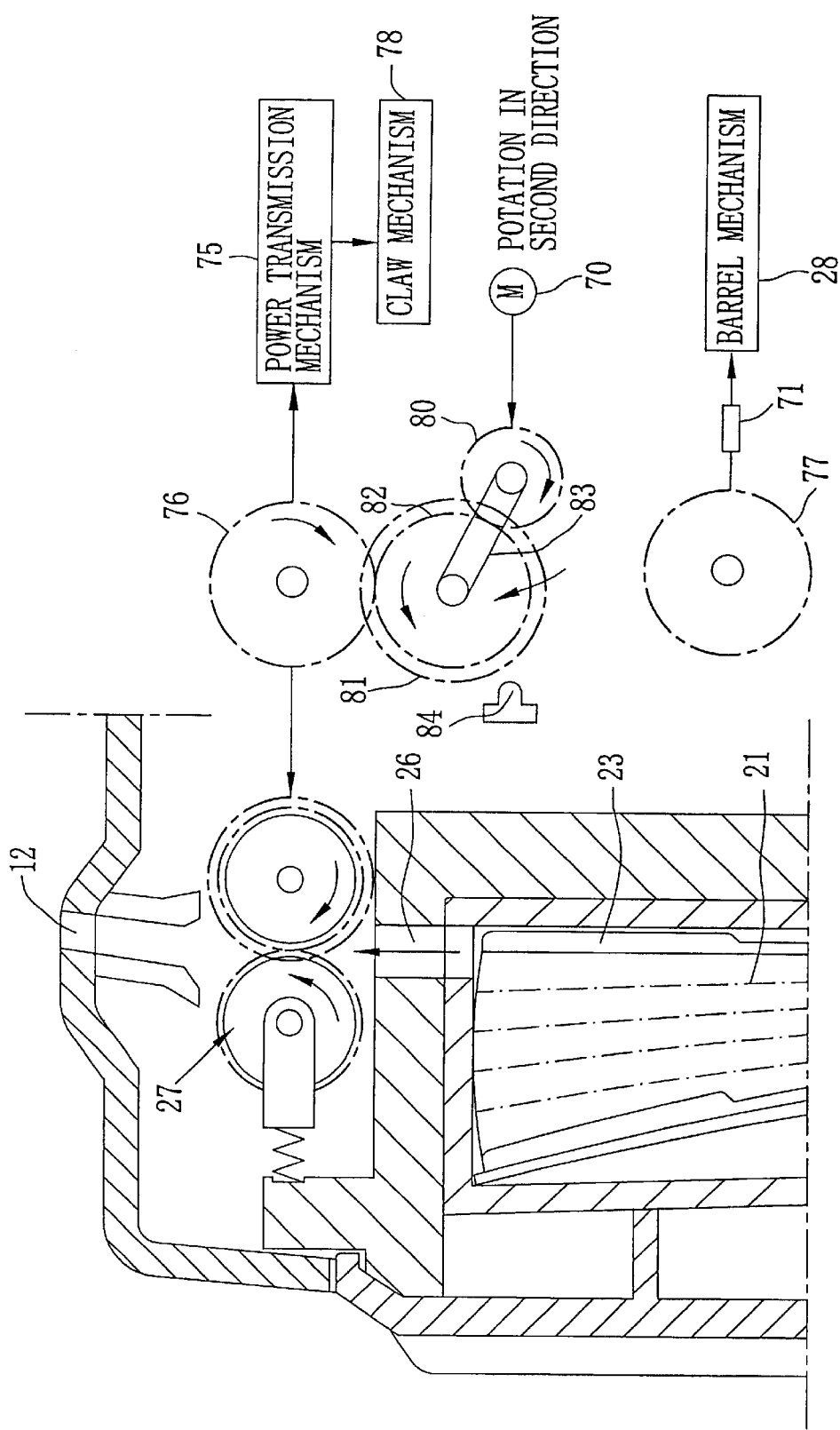

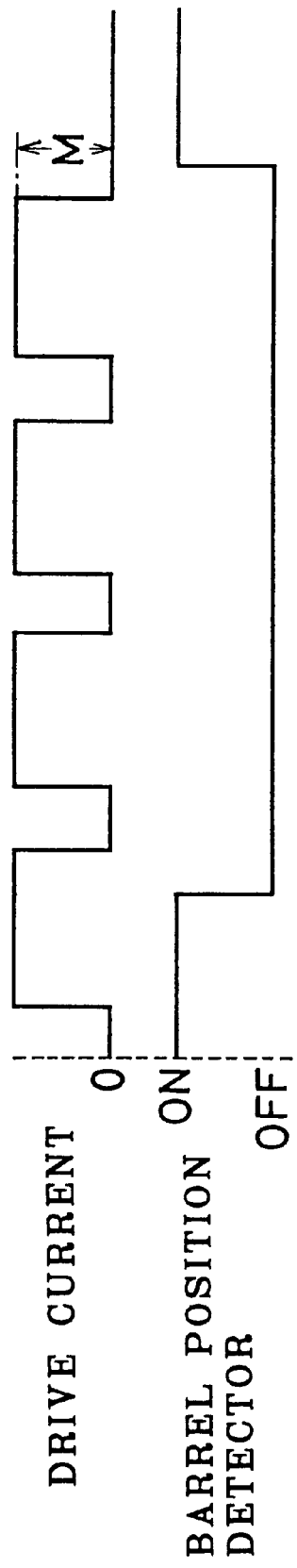
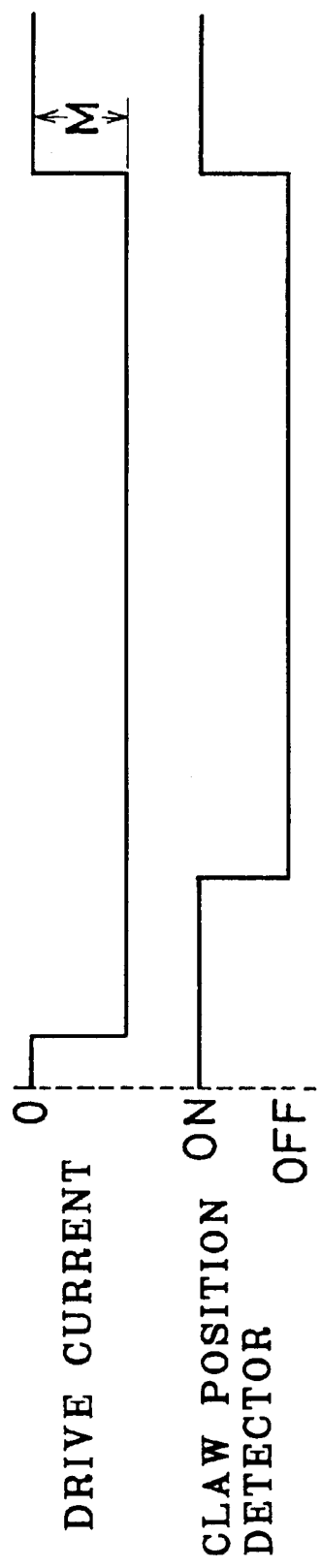
FIG. 28A
FIG. 28B

CAMERA WITH MOTOR-DRIVEN LENS BARREL

This application is a divisional of application Ser. No. 09/353,143, filed on Jul. 14, 1999, now U.S. Pat. No. 6,208,809, the entire contents of which are hereby incorporated by reference.

BACKGROUND OF THE INVENTION

1. Field of the Invention

The present invention relates to a camera with a lens barrel mechanism which is driven by a motor only in one rotational direction, wherein rotational power of the motor in the other direction is used for driving another mechanism.

2. Background Arts

An instant camera takes a photograph on a sheet of instant film by exposing the instant film to an optical image of a subject formed through a taking lens. After the exposure, a film feed out mechanism is driven to feed out the exposed instant film. The film feed out mechanism is constituted of a claw mechanism and a pair of developing rollers, and is driven by a motor. The claw mechanism rakes the exposed instant film out of a film pack loaded in the instant camera and feeds it toward the developing rollers. Then, the developing rollers nip and feed out the instant film through a film exit of the instant camera. While the instant film is squeezing through the developing rollers, a pod containing a developing solution is broken and the developing solution is spread over the exposed instant film. Thereby, a latent picture photographed on the instant film is developed to be a visible positive picture.

Because the sheet size of the instant film is relatively large, the instant camera must have a sufficiently large room for loading the instant film, so it is difficult to make the instant camera compact in comparison with 35 mm cameras and APS cameras using IX 240 type film. In order to improve the portability of the instant camera, JPA 4-194829 discloses a collapsible instant camera wherein a lens board having a taking lens therein is mounted to a camera body through bellows so that the board may be folded onto a front wall of the camera body or protruded from the front wall. Because the collapsible instant camera is complicated in construction and needs a large number of parts, the production cost is high and the collapsible instant camera comes to be expensive.

It is desirable to introduce such a lens barrel in the instant camera that has been used in conventional compact cameras and is movable between a stowed position and at least a protruded position, but there are many problems to solve in practice. It is necessary to provide a second motor for driving the lens barrel besides the motor for the film feed out mechanism, since the movable lens barrel is driven by a motor in one direction to protrude or in a second or opposite direction to retract. In addition, where the taking lens is focused through a focusing mechanism that is driven by a different motor from that used for protrusion and retraction of the lens barrel, the instant camera must mount at least three motors. This is disadvantageous in view of compactness and cost.

To reduce the number of motors, JPZ 1869801 discloses a teaching to use rotational power of a motor in one direction for moving a lens barrel between a wide-angle position and a telephoto position, and rotational power in the other or opposite direction for driving another mechanism, e.g. a film advancing mechanism or a shutter charging mechanism. Also, JPA 9-236854 discloses a teaching to drive a film advancing, winding and rewinding mechanism by rotating a motor in one direction and drive another mechanism by rotating the motor in the other direction.

However, these prior arts just propose the teaching, and do not disclose any concrete solution for the achievement. For instance, there is no teaching how to move the lens barrel in opposite directions by rotating the motor in one direction, or how to focus the taking lens. Moreover, the torque necessary for driving one mechanism is usually different from that for another mechanism. When using the rotational power of the same motor for different mechanisms, the difference in the torque must be taken into consideration. Otherwise, the mechanism cannot operate stably and would rise a certain noise.

Meanwhile, many of instant cameras and inexpensive cameras use a taking lens with a relatively short focal length and a relatively small lens aperture, so that the taking lens covers a wider subject distance range within the depth of field. In those instant cameras or inexpensive cameras, the whole subject distance to cover is often divided into several zones, e.g. near, middle and far distance zones, and the taking lens is designed to be set to one of several focusing positions determined for the respective subject distance zones. It is well-known in the art to provide a manually operated zone focusing device instead of or in addition to an automatic focusing device. The zone focusing device allows the photographer to designate one of predetermined subject distance zones so as to focus the taking lens on the designated subject distance zone.

In the conventional zone focusing device, an operation member, such as a switching lever or dial, is connected to a focusing ring of the taking lens through an interconnection mechanism to switch over the focusing position by rotating the focusing ring through the operation member. So the operation member has been located in proximity to the taking lens to improve the space efficiency and simplify the interconnection mechanism. However, the conventional location of the operation member of the zone focusing device is not handy for the photographer, and also limit the layout of other camera elements.

SUMMARY OF THE INVENTION

In view of the foregoing, an object of the present invention is to provide a camera, wherein a lens barrel of a taking lens can move back and forth along an optical axis by rotating a motor in one direction.

A further object of the present invention is to provide a camera, wherein rotational power of a motor in one direction is used for focusing as well as for moving a lens barrel back and forth.

Another object of the present invention is to provide a camera which uses rotational power of a motor in one direction for driving a lens barrel mechanism, and rotational power of the motor in the other direction for driving another mechanism, while considering differences in necessary torque between these mechanisms.

Still another object of the present invention is to provide a camera with a manually operated zone focusing device wherein an operation member of the zone focusing device may be located in an appropriate position without lowering the space efficiency of the camera.

According to the present invention, a camera is comprised of a barrel driving assembly immovable in the direction of an optical axis of the taking lens and including a drive ring, the drive ring being rotated about the optical axis in one direction when a rotational power of a motor in a first direction is transmitted to the drive ring; a movable barrel assembly holding a taking lens therein, and movable back and forth along the optical axis of the taking lens relative to the camera body; and a cam mechanism interconnecting the barrel driving assembly and the movable barrel assembly such that the movable barrel assembly makes at least one stroke of reciprocative movement along the optical axis while the drive ring makes one revolution in the one rotational direction.

According to this configuration, it is possible to use a rotational power of the motor in a second direction for driving a second mechanism, such as a film feed out mechanism for an instant film unit or a film advancing mechanism for a roll film. Therefore, it is unnecessary to provide a separate motor for the second mechanism.

By interconnecting the drive ring with the motor through a clutch mechanism that is switched over according to rotational direction of the motor, the rotational power of the motor in the first direction is transmitted to the drive ring, and a rotational power of the motor in the second direction to the second mechanism.

According to a preferred embodiment, a motor drive device of the camera supplies a different amount of electric power per unit time to the motor for rotating the motor in the first direction from that supplied for rotating the motor in the second direction, in accordance with differences in necessary rotational power between the drive ring and the second mechanism.

According to a preferred embodiment, the movable barrel assembly comprises a movable barrel, and the barrel driving assembly comprises the drive ring, whereas the cam mechanism comprises an endless cam groove provided on one of the movable barrel and the drive ring and at least a cam pin provided on the other of the movable barrel and the drive ring. The cam pin is engaged in the endless cam groove through an axial guide slit formed through an axial guide member, and the endless cam groove has segments extending obliquely to the rotational direction of the drive ring such that the cam pin moves back and forth in the direction of the optical axis at least once while the drive ring makes one revolution in the one rotational direction.

By providing the endless cam groove with at least two front segments that extend in a circumferential direction and are shifted in the direction of the optical axis from each other, the movable barrel may be stepwise set to at least two different protruded positions by rotating the drive ring in the one direction. By making the taking lens be set at different focusing positions at the different protruded positions of the movable barrel, it is unnecessary to provide a separate focusing motor beside the motor used for protrusion and retraction of the movable lens barrel.

According to another preferred embodiment, the movable barrel assembly comprises a rear movable barrel movable back and forth along the optical axis relative to the camera body while rotating about the optical axis, and a front movable barrel holding the taking lens and mounted in the rear movable barrel so as to be movable back and forth along the optical axis relative to the rear movable barrel, whereas the cam mechanism comprises a first cam mechanism interconnecting the rear movable barrel with the barrel driving assembly such that the rear movable barrel rotates together with the drive ring in the one rotational direction and makes at least one stroke of reciprocative movement along the optical axis per one revolution, and a second cam mechanism interconnecting the rear movable barrel and the front movable barrel such that the front movable barrel makes at least one stroke of reciprocative movement along the optical axis while the rear movable barrel makes one revolution.

A first endless cam groove of the first cam mechanism and a second endless cam groove of the second cam mechanism have similar contours to each other, and cam pins of these cam mechanisms move along the endless cam grooves simultaneously in the same direction by the same angular amount. By providing least one of the first and second endless cam grooves with at least two front segments that extend in a circumferential direction and are shifted in the direction of the optical axis from each other, the front movable barrel may be stepwise set to at least two different protruded positions relative to the camera body by rotating the drive ring in the one direction.

Also in this case, it is preferable to determine the different protruded positions of the front movable barrel in correspondence with different focusing positions of the taking lens, in order to use the motor for protrusion and retraction of the movable lens barrel and for focusing as well.

According to a preferred embodiment, the camera further comprises a zone focusing device having a manually operated zone selecting member for selecting a subject distance zone to be focused on by the taking lens from among different subject distance zones. The zone focusing device generates a zone selection signal representative of the subject distance zone selected through the zone selecting member. By determining the different focusing positions of the taking lens in correspondence with the different subject distance zones, it is possible to set the taking lens at one of the different protruded positions by controlling the motor in accordance with the zone selection signal. Because the focusing of the taking lens is carried out responsive to the zone selection signal, the manually operated zone selecting member may be located at an appropriate position on the camera body. Since it is unnecessary to provide an interconnecting mechanism between the taking lens and the zone selecting member, the space efficiency of the camera is improved.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limiting the present invention, wherein like reference numerals designate like or corresponding parts throughout the several views, and wherein:

FIG. 10 is a schematic diagram illustrating a clutch mechanism for coupling a motor either to the lens barrel mechanism or to a film feed out mechanism for feeding an instant film unit out of the instant camera;

FIG. 11 is an explanatory view of the clutch mechanism in a first switching position where the motor is coupled to the lens barrel mechanism;

FIG. 12 is an explanatory view of the clutch mechanism in a second switching position where the motor is coupled to the film feed out mechanism;

FIG. 28A shows timing charts illustrating a positive drive current supplied to the motor for driving the lens barrel mechanism in relation to an output signal from a barrel position detector;

FIG. 28B shows timing charts illustrating a negative drive current supplied to the motor for driving the film feed out mechanism in relation to an output signal from a claw position detector;

DETAILED DESCRIPTION OF THE PREFERRED EMBODIMENT

Figure 1:
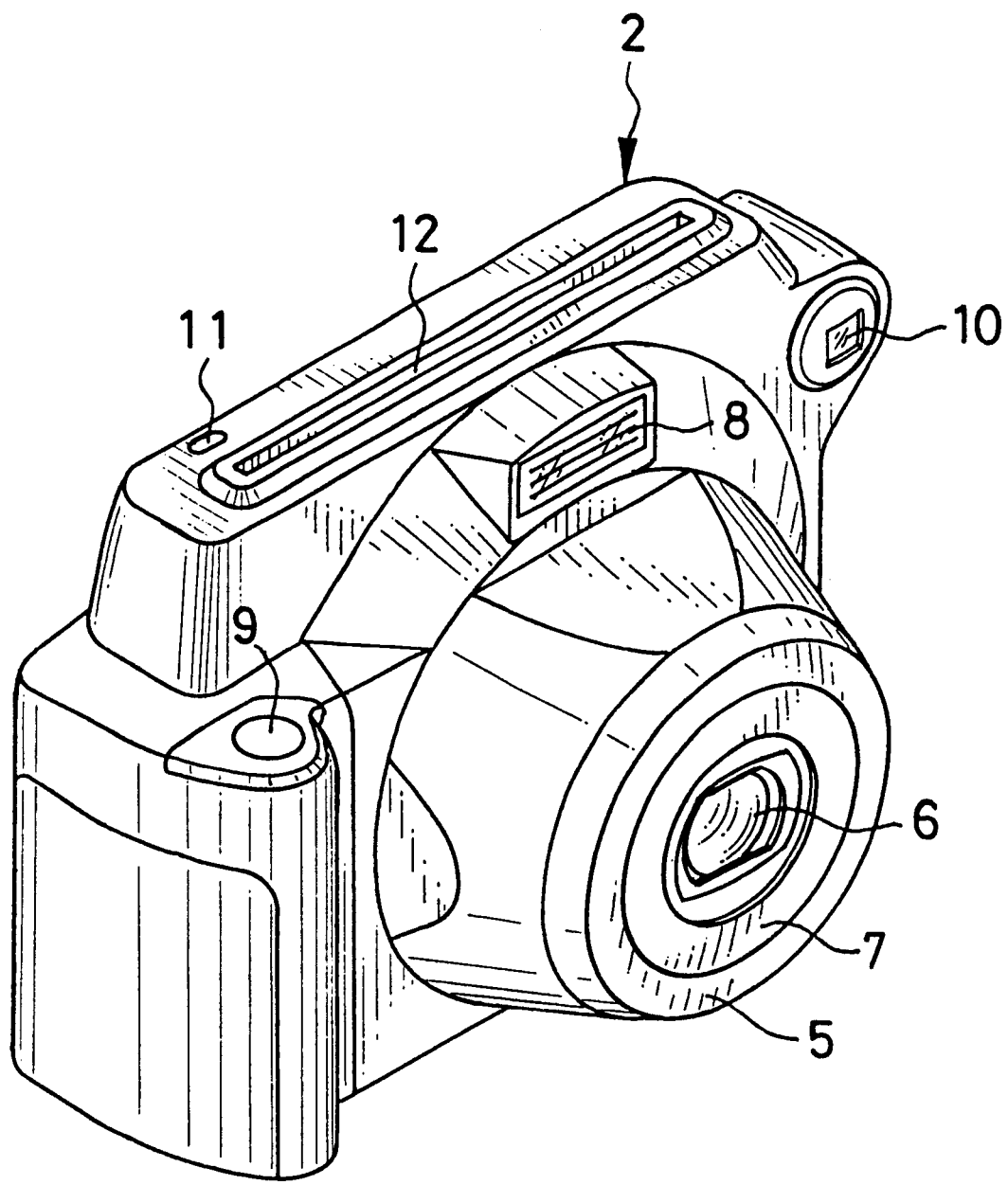
FIG. 1 is a perspective view of an instant camera according to a first embodiment of the invention, with its lens barrel mechanism stowed.

In FIG. 1, an instant camera 2 according to a first embodiment has a lens hood 5 that protrudes forward from the front of a substantially rectangular camera body. A movable lens barrel 7 holding a taking lens 6 therein is mounted inside the lens hood 5. A flash window 8 is located above the lens hood 5, and a shutter button 9 and a finder objective window 10 are located on opposite sides of the flash window 8. A power switch 11 and a film exit 12 are provided on a top side of the camera body.

Figure 2:
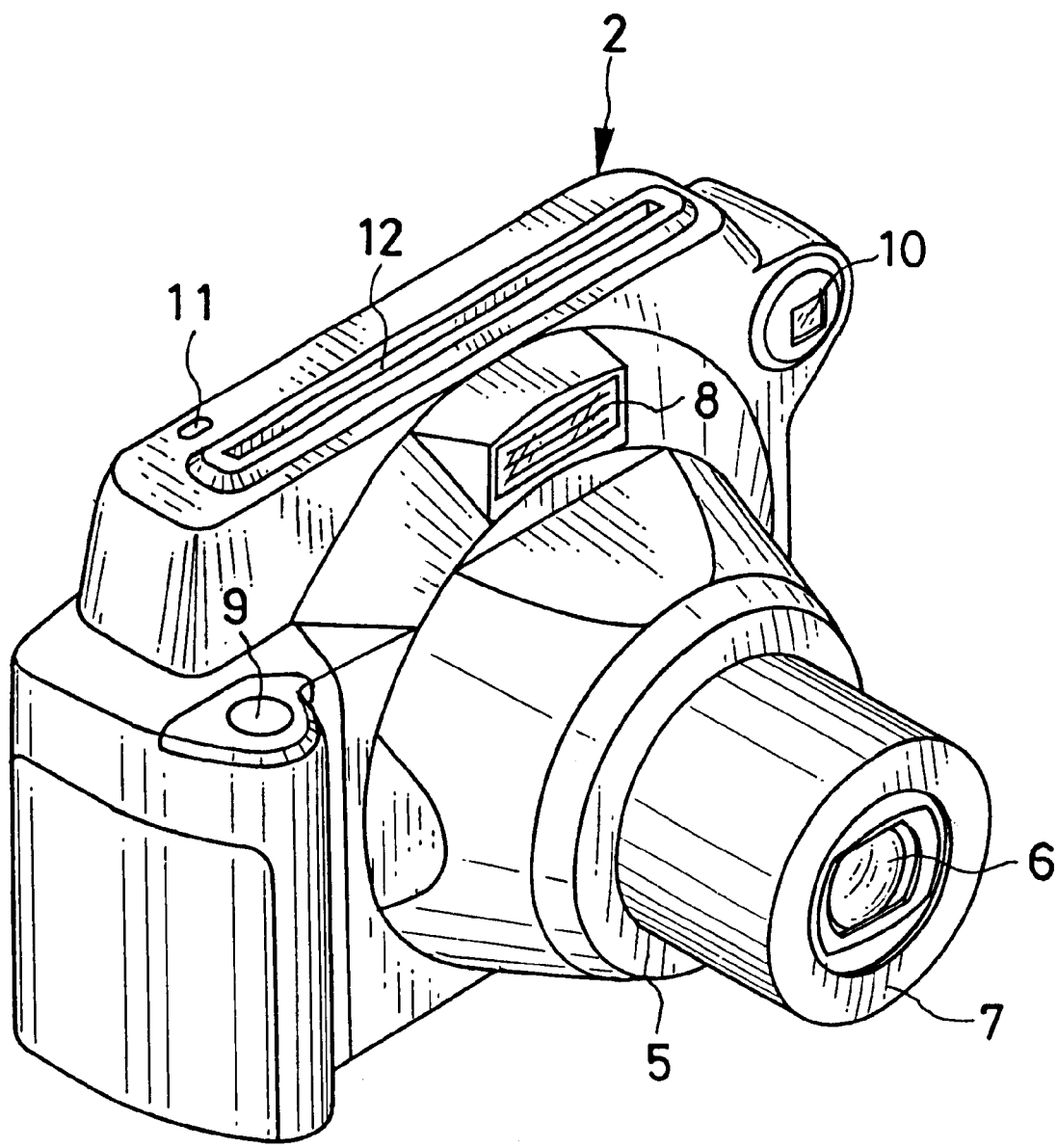
FIG. 2 is a perspective view of the instant camera of the first embodiment with its lens barrel mechanism protruded.

While the power switch 11 is off, the instant camera 2 is inactive, and the movable barrel 7 is stowed in the lens hood 7. By turning the power switch 11 on, the instant camera 2 is activated, and the movable barrel 7 is protruded to the object side out of the lens hood 7, as shown in FIG. 2.

Figure 3:
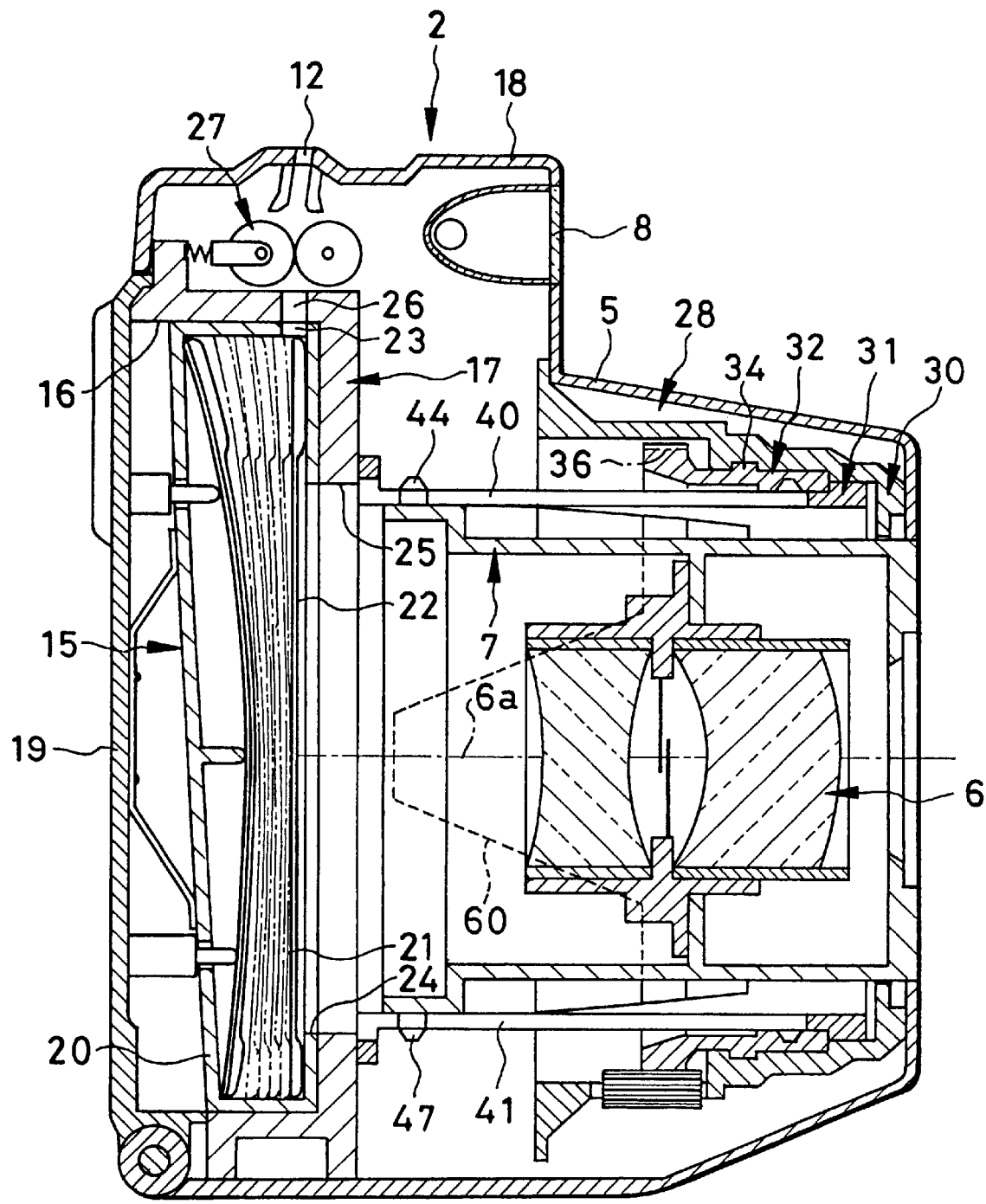
FIG. 3 is a vertical sectional view of the instant camera of the first embodiment, at the stowed position of the lens barrel mechanism.

As shown in FIG. 3, the instant camera 2 is provided with a film pack chamber 16 for holding a film pack 15 in a rear portion of the camera body. Photographic elements are mounted to a basic frame 17, and are covered with an outer cover 18 having the lens hood 5 formed integrally therewith. The film pack 15 is loaded in the film pack chamber 16 by opening a rear lid 19 that is hinged to the outer cover 18.

The film pack 15 contains a pile of instant film units 21 in a box-shaped case 20. The instant film unit 21 consists of a sheet of instant film, a developing solution pod and a trap portion for trapping developing solution from the pod, as well-known in the art. A rectangular exposure aperture 24 is formed through the case 20, and a corresponding exposure aperture 25 is formed through the basic frame 17 in front of the film pack chamber 16. The exposure apertures 24 and 25 define a horizontally elongated large size exposure frame. Through the exposure apertures 24 and 25, an exposure surface 22 of the frontmost instant film unit 21 in the film pack 15 is exposed to an optical image of a subject formed through the taking lens 6. The exposed instant film unit 21 is discharged through slits 23 and 26 formed through top walls of the case 20 and the basic frame 17.

A pair of developing rollers 27 are mounted on a top side of the basic frame 17. The developing rollers 27 is provided for feeding out the exposed instant film unit 21 through the film exit 12 while breaking the developing solution pod and spreading the developing solution over the exposure surface 22.

Figure 4:
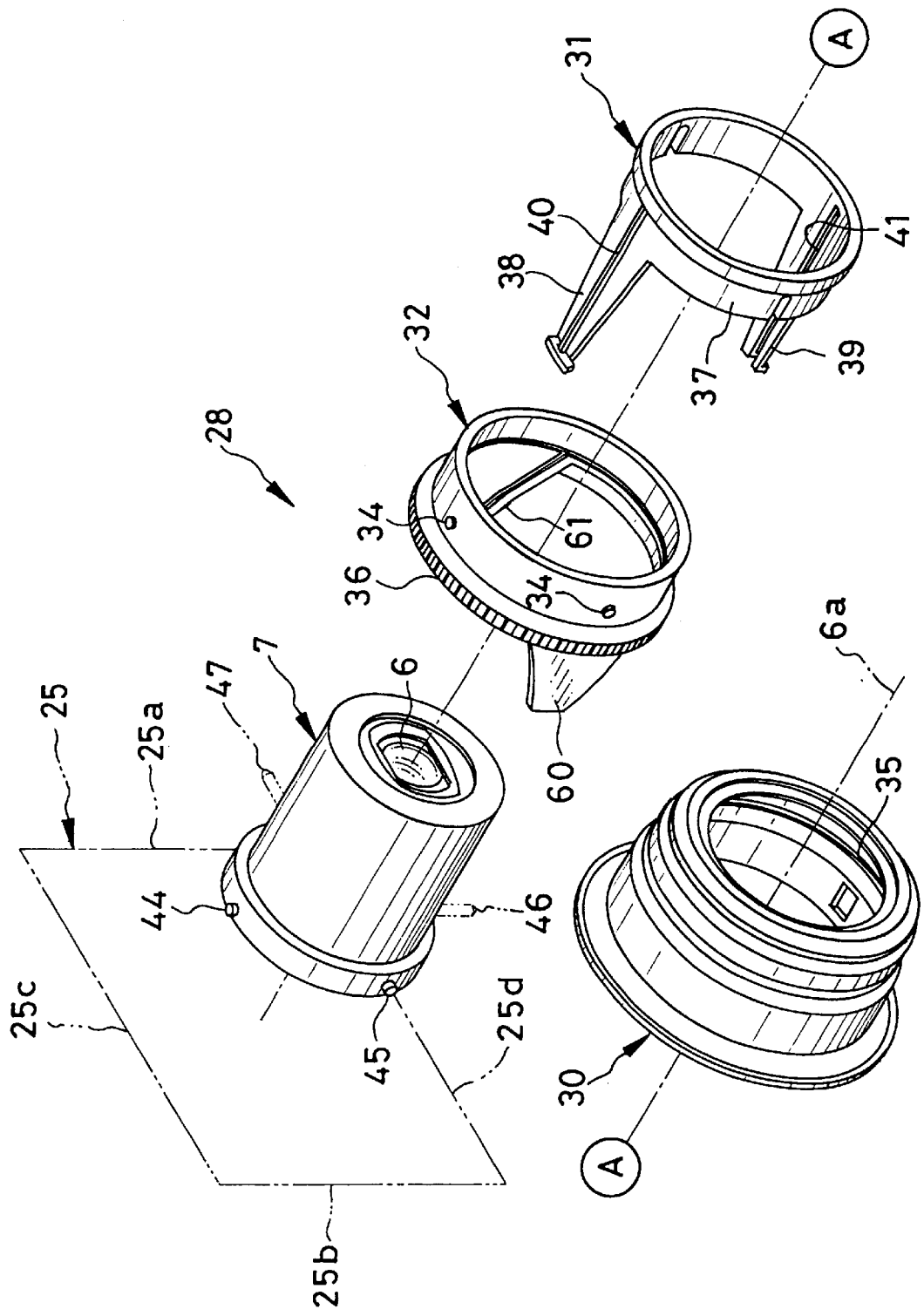
FIG. 4 is an exploded perspective view of the lens barrel mechanism of the first embodiment.

As shown in detail in FIG. 4, a lens barrel mechanism 28, including the movable lens barrel 7, a fixed barrel 30, an axial guide ring 31 and a cam barrel 32, is mounted inside the lens hood 5. The cam barrel 32 has guide pins 34 on its outer periphery, which are engaged in an annular guide groove 35 formed around an inner periphery of the fixed barrel 30, such that the cam barrel 32 can rotate in the fixed barrel 30. The cam barrel 32 also has a drive gear 36 formed around the outer periphery, so the cam barrel 32 functions as a drive ring. Through the drive gear 36, rotational power of a motor 70 (see FIG. 9) is transmitted to the cam barrel 32. As set forth in detail later, the cam barrel 32 is rotated only in one direction by rotation of the motor 70 in a first direction.

The axial guide ring 31 stops the movable barrel 7 from rotating, and guides the movable barrel 7 only in the axial direction. The axial guide ring 31 consists of a ring portion 37 and a pair of axial projections 38 and 39 that protrude rearward from the ring portion 37 through inside of the cam barrel 32, and are secured to the basic frame 17. The projections 38 and 39 are located at the top and the bottom of the ring portion 37 when the instant camera 2 is elected. An axial guide slit 40 or 41 is formed through the projections 38 and 39 that has the same length as a movable range of the movable barrel 7 in an axial direction along an optical axis 6a of the taking lens 6. On the other hand, the cam barrel 32 is longer than the movable range of the movable barrel 7 in the axial direction. The movable barrel 7 has four cam pins 44, 45, 46 and 47 on its outer periphery. The cam pins 44 to 47 are spaced by 90° from each other. The cam pins 44 and 46 at the top and the bottom of the movable barrel 7 are respectively inserted in the axial guide slits 40 and 41.

Figure 5:
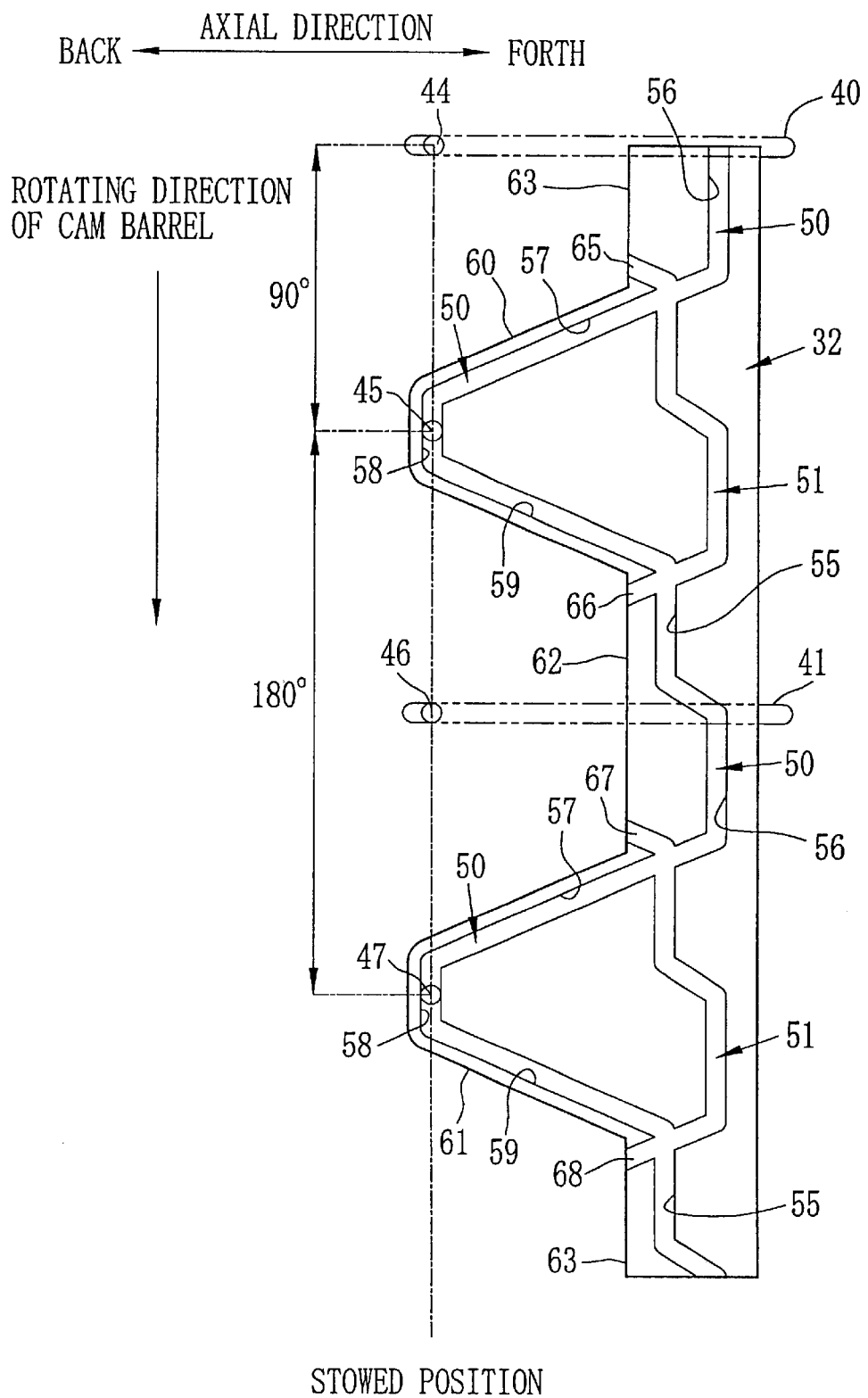
FIG. 5 is an unfolded view of a cam barrel of the lens barrel mechanism shown in FIG. 4, illustrating the relationship between cam pins and cam grooves at the stowed position of the lens barrel mechanism.

As shown in FIG. 5, the cam barrel 32 has first and second cam grooves 50 and 51 formed around its inner periphery. The first cam groove 50 is endless, and is always engaged with the cam pins 45 and 47 of the movable barrel 7.

The first cam groove 50 consists of a first segment 55 extending in the rotational direction or circumferential direction of the cam barrel 32, a second segment 56 extending circumferentially to the cam barrel 32 and connected to the first portion 55, a third segment 57 connected to the second segment 56 and extending obliquely or diagonally to the circumferential direction of the cam barrel 32, a circumferentially extending fourth segment 58 connected to the third segment 57, and an obliquely extending fifth segment 59 connected to the fourth segment 58. The first to fifth segments 55 to 59 extend over one-half of the inner periphery of the cam groove 32, and another half of the first cam groove 50 consists of the same segments 55 to 59 in the same order. The other end of the fifth segment 59 is connected to the first segment 55 of the next half of the first cam groove 50.

The cam barrel 32 is rotated by the motor 70 only in one direction, as implied by an arrow in FIG. 5. When the movable lens 7 is stowed in the lens hood 5, the cam pins 45 and 47 are located in the fourth segments 58. By rotating the cam barrel 32 in the one direction, the cam pins 45 and 47 move along the third segments 57. Since the cam barrel 32 does not move in the axial direction because of the engagement between the guide pins 34 of the cam barrel 32 and the annular guide groove 35 of the fixed barrel 30, the movable barrel 7 is caused to move forth, i.e. to the object side, as the cam pins 45 and 47 move along the third segments 57.

Figure 6:
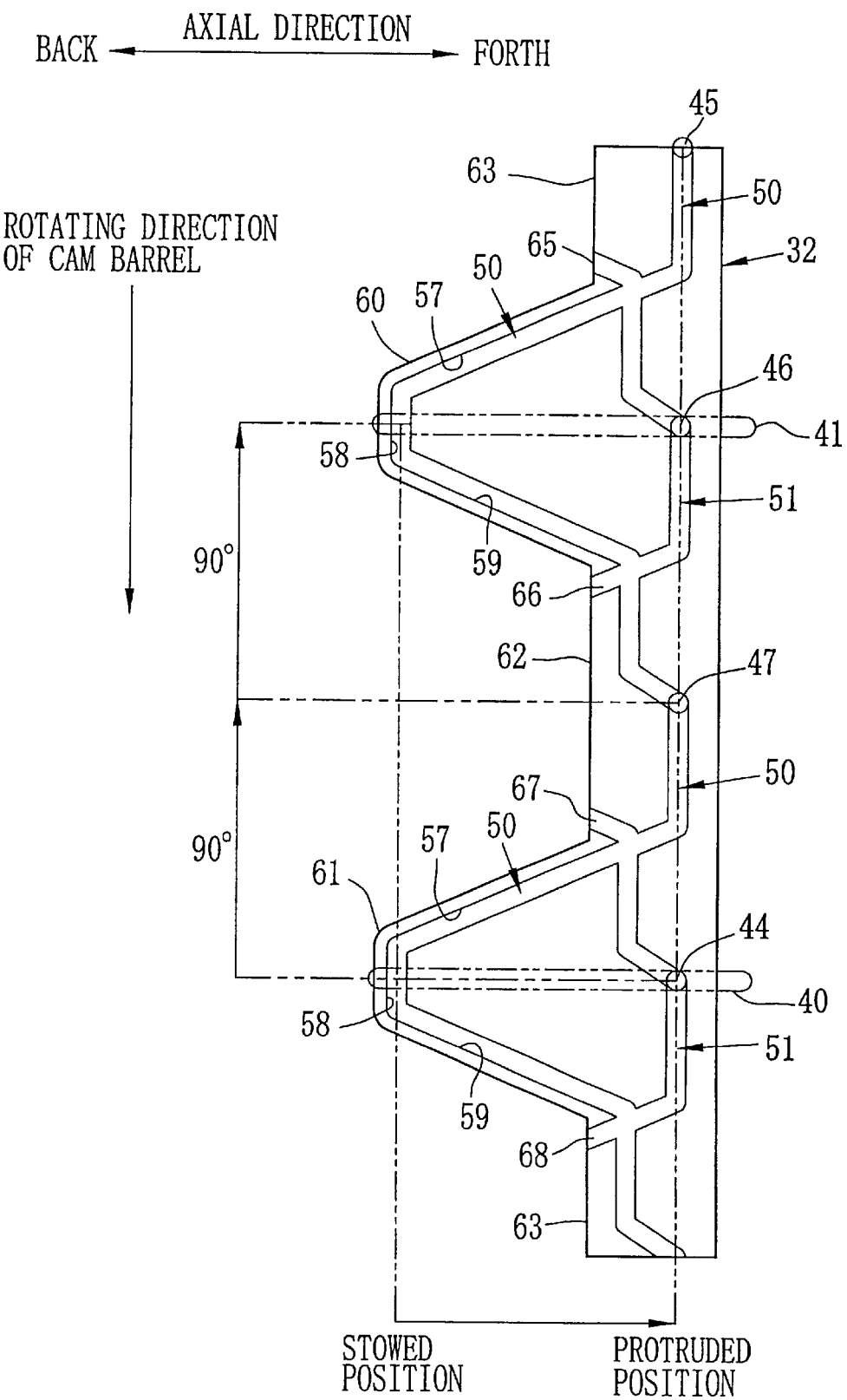
FIG. 6 is a similar view to FIG. 5, but illustrating the relationship between the cam pins and cam grooves at the protruded position of the lens barrel mechanism.

When the cam barrel 32 is rotated 90° from the stowed position, the cam pins 45 and 47 are located the second segments 56, as shown in FIG. 6, where the movable barrel 7 is protruded fully from the lens hood 5. By rotating the cam barrel 32 through 90° from the fully protruded position shown in FIG. 6, the movable barrel 7 return to the stowed position, as the cam pins 45 and 47 move along the first and then fifth segments 55 and 59 of the first cam groove 50. Accordingly, the movable barrel 7 makes two strokes of reciprocative movement while the cam barrel 32 rotates 360°.

Where the cam pins 45 and 47 are located in the second segments 56, and the movable barrel 7 is fully protruded, the focal point of the taking lens 6 is in a near subject distance zone. By rotating the cam barrel 32 till the cam pins 45 and 47 are located in the first segments 55, the movable barrel 7 is a little retracted, and the focal point of the taking lens 6 is set to a far subject distance zone. Although it is not shown in the drawings, the instant camera 2 of this embodiment may have a manually operated zone selecting device that allows the photographer to decide whether the taking lens 6 is to focus on the near subject distance zone or the far subject distance zone. Alternatively, the instant camera 2 may have an automatic focusing device which measures a subject distance and sets the focal point of the taking lens 6 either to the near subject distance zone or to the far subject distance zone depending upon the measured subject distance.

Figure 7:
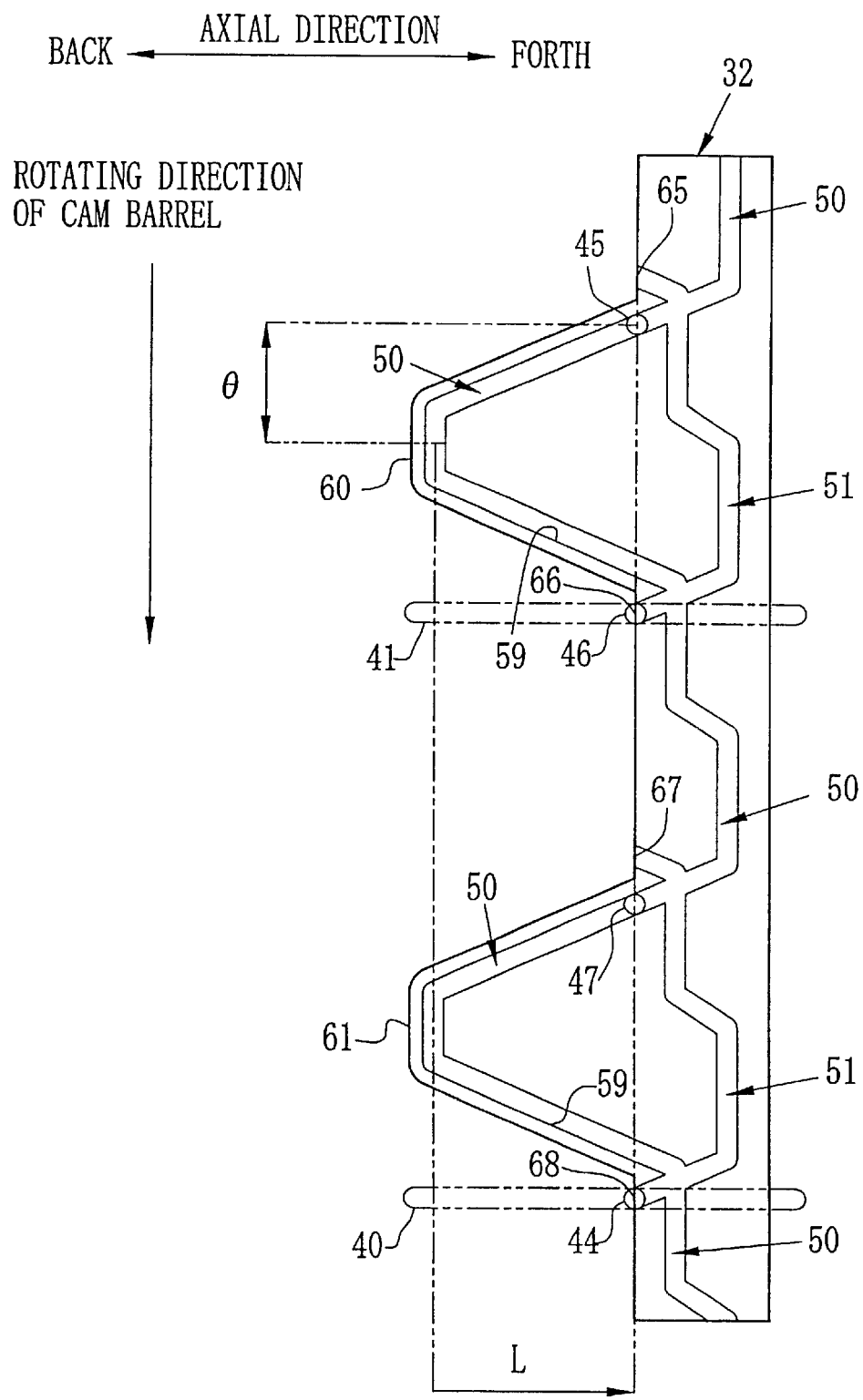
FIG. 7 is a similar view to FIG. 5, but illustrating the relationship between the cam pins and cam grooves at an intermediate position of the lens barrel mechanism.

On the other hand, the second cam groove 51 has a similar contour to the first and second segments 55 and 56 of the first cam groove 50, but is shifted 90° from the first cam groove 50. In place of the third and fifth segments 57 and 59, the second cam groove 51 has short segments that extend obliquely to the rotational direction of the cam barrel 32 and terminate with open ends 65, 66, 67 and 68. Through these open ends 65 to 68, the other pair of cam pins 44 and 46 of the movable barrel 7 move into and out of the second cam groove 51, as the drive ring 32 rotates. As shown in FIG. 7, the cam pins 44 and 46 are engaged in the second cam groove 51 through the axial guide slits 40 and 41, when the cam barrel 32 is rotated by a predetermined angle θ from the stowed position of the movable lens barrel 7 toward the protruded position, and thus the movable lens 7 moves by a length L forth from the stowed position. Since the cam pins 44 and 46 are always engaged in the axial guide slits 40 and 41, and the cam pins 45 and 47 are always engaged in the first cam groove 50, the movable barrel 7 is maintained in parallel with the optical axis 6a, even while the cam pins 44 and 46 are not engaged with the second cam groove 51.

The image side rim of the cam barrel 32 is cut away along the third to fifth segments 57 to 59 of the first cam groove 50, so that there are two tapered projections 60 and 61 interlaced with two cutouts 62 and 63. The length of the cutouts 62 and 63 in the circumferential direction is greater than that of the tapered projections 60 and 61.

Figure 8:
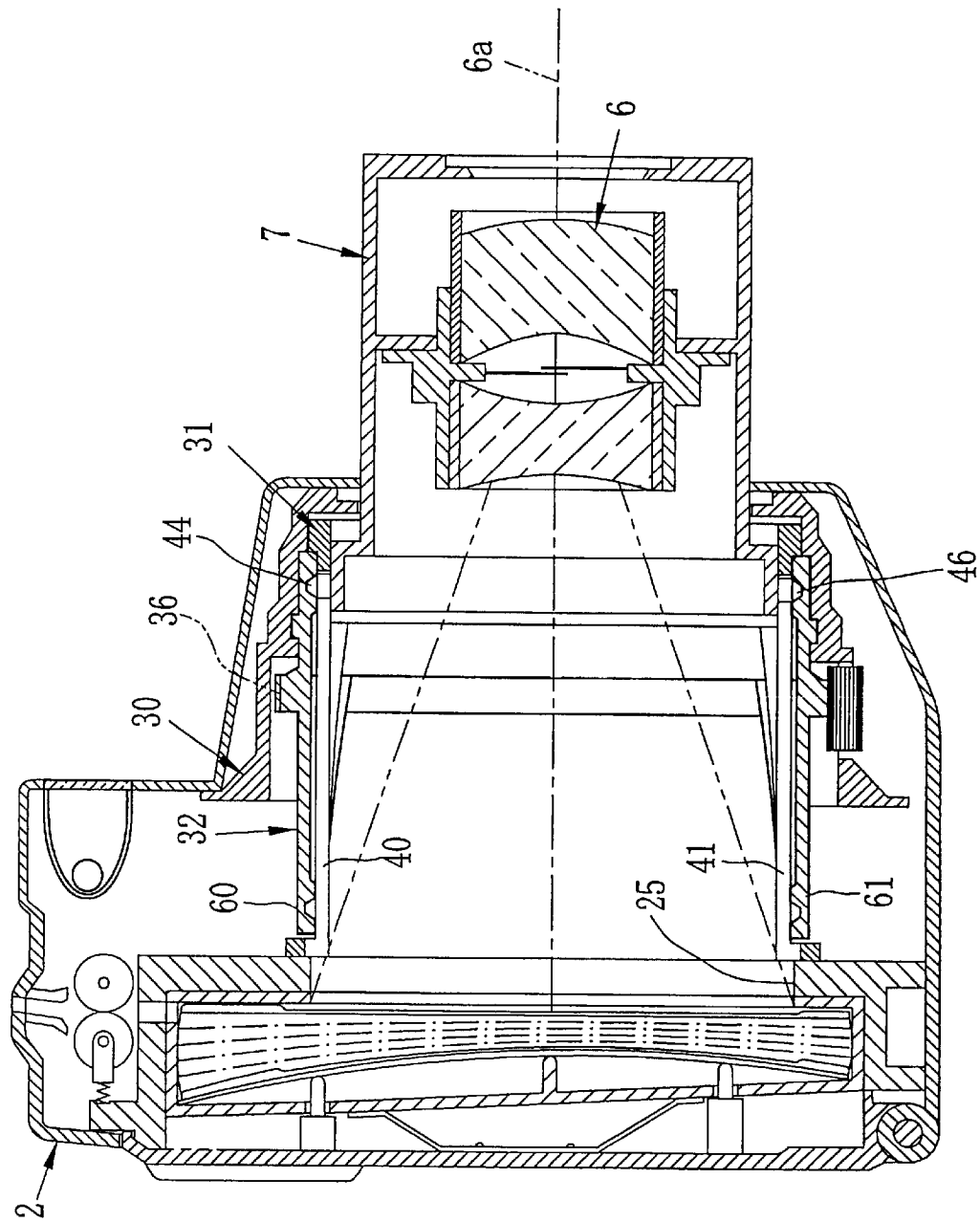
FIG. 8 is a vertical sectional view of the instant camera of the first embodiment at the protruded position of the lens barrel mechanism.
Figure 9:
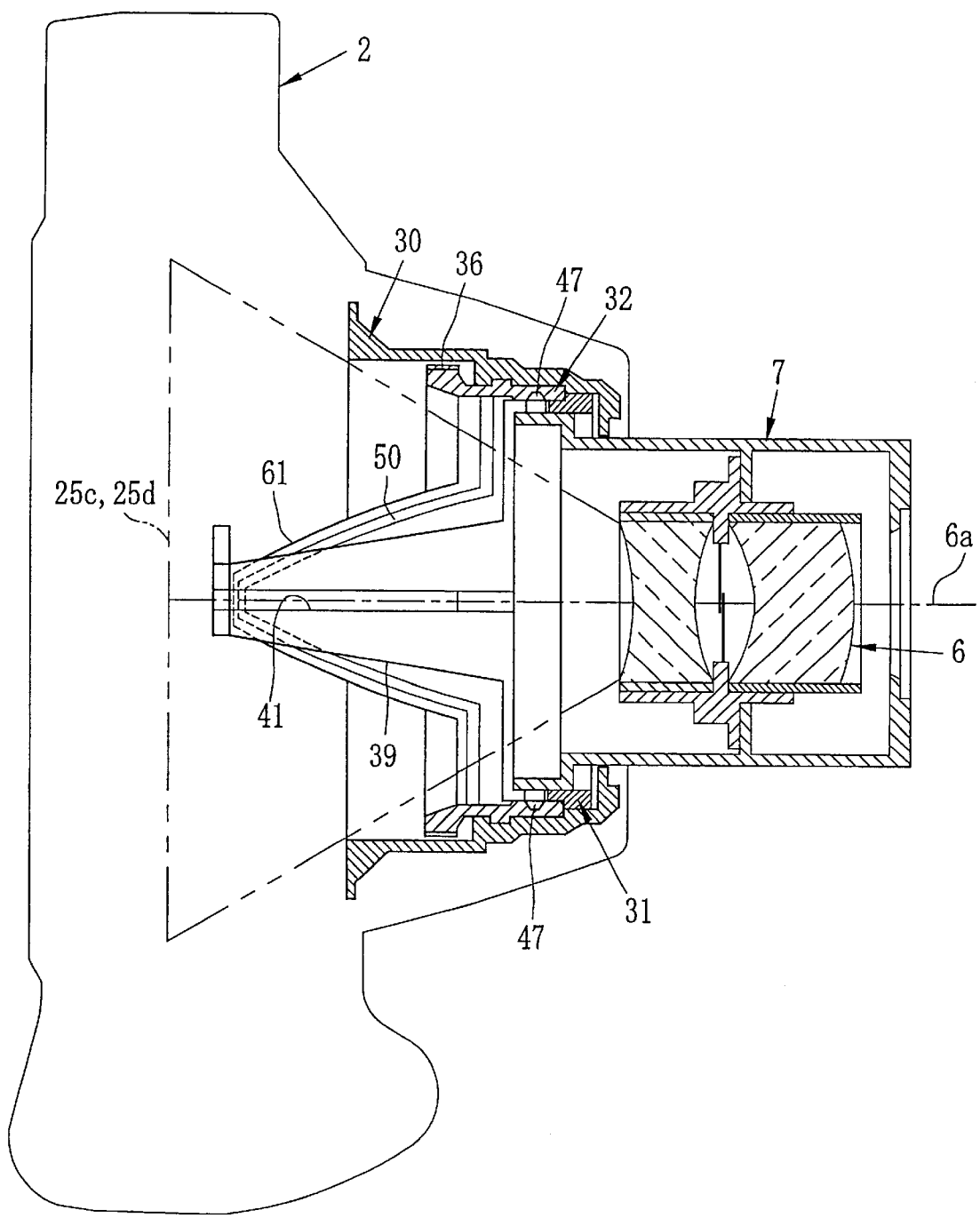
FIG. 9 is a horizontal sectional view of the instant camera of the first embodiment at the protruded position of the lens barrel mechanism.

As shown in FIG. 6, the tapered projections 60 and 61 are overlaid on the projections 38 and 39 of the axial guide ring 31 in the protruded position of the movable barrel 7. That is, the tapered projections 60 and 61 are located top and bottom sides 25c and 25d of the exposure aperture 25, as shown in FIGS. 8 and 9. Since the exposure aperture 25 is horizontally elongated, i.e., left and right sides 25a and 25b of the exposure aperture 25 is shorter than the top and bottom sides 25c and 25d, the light beams from the taking lens 6 can spread in the diagonal directions of the exposure aperture through the cutouts 62 and 63, without interfering with the cam barrel 32, when the movable barrel 7 is in the protruded position, that is, while the instant camera 2 is activated. Although the tapered projections 60 and 61 are located in the optical path of the taking lens 6 on opposite horizontal sides of the optical axis 6a while the movable lens 7 is in the stowed position, the instant camera 2 is inactive in that position, so there is no problem about that. Therefore, the diameter of the cam barrel 32 may be minimized by providing the cutouts 62 and 63.

As described above, the lens barrel mechanism 28 of the instant camera 2 is driven by the motor 70 only in one rotational direction. As shown in FIG. 10, the same motor 70 is used for driving a film feed out mechanism 72 for feeding the exposed instant film unit 21 out through the film exit 12. For this purpose, a clutch mechanism 73 is provided to couple the motor 71 either to the lens barrel mechanism 28 or to the film feed out mechanism 72 according to the rotational direction of the motor 71. The rotational power of the motor 70 in the first direction is transmitted to the lens barrel mechanism 28 through an entrance gear 77 and a transmission mechanism 71.

The rotational power of the motor 70 in a second direction is transmitted to a film feed out mechanism through power transmission mechanisms 74 and 75, and an entrance gear 76. The film feed out mechanism 72 consists of the developing roller pair 27, and a claw mechanism 78. The claw mechanism 78 rakes out the exposed instant film unit 21 from the case 20 through the slits 23 and 26 when driven by the motor 70, and the exposed instant film unit 21 squeezes through the developing rollers 27 out of the film exit 12.

The clutch mechanism 73 consists of a sun gear 80, first and second planet gears 81 and 82 and an arm 83. The first planet gear 81 has a larger diameter than the second planet gear 82. One end of the arm 83 is mounted rotatable on a rotary shaft 80a of the sun gear 80. The planet gears 81 and 82 are secured to a common rotary shaft 81a that is rotatably supported on the other end of the arm 83. The second planet gear 81 is kept in mesh with the sun gear 80. The sun gear 80 is rotated by the rotational power of the motor 70 in both directions. As the sun gear 80 rotates, the first planet gear 81 revolves around the sun gear 80 while rotating on its own axis.

When the motor 70 rotates in the first direction, the sun gear 80 rotates in a counterclockwise direction in FIG. 10, so the arm 83 swings in the counterclockwise direction, taking the second planet gear 82 away from the entrance gear 76 and coupling the first planet gear 81 to the entrance gear 77, as shown in FIG. 11. As a result, the rotational power of the motor 70 is transmitted to the lens barrel mechanism 28. On the other hand, when the motor 70 rotates in the second direction opposite to the first direction, the sun gear 80 rotates in a clockwise direction in FIG. 10, so the arm 83 swings in the clockwise direction, taking the first planet gear 81 away from the entrance gear 77 and coupling the second planet gear 82 to the entrance gear 76, as shown in FIG. 12. Thus, the rotational power of the motor 70 is transmitted to the film feed out mechanism.

The entrance gears 76 and 77 are located above and below the sun gear 80 in the camera body. Therefore, when switching over from the lower entrance gear 77 to the upper entrance gear 76, the arm 83 must push up the planet gears 81 and 82 against the gravity. In order to perform the switching in this direction without fail, a stationary one-tooth gear 84 is provided in a middle of the switching course of the planet gears 81 and 82, such that the second planet gear 82 is engaged with the one-tooth gear 84 on the way of switching. The one-tooth gear 84 then gives the arm 84 a supplementary revolving power around the sun gear 80.

The motor 70 is driven through a driver 85 under the control of a controller 86. The controller 86 is fed with operation signals from the shutter button 9, a rear lid open-close switch 87, and the power switch 11. The controller 86 drives the motor 70 to rotate in the first direction upon the power switch 11 being turned on, causing the movable barrel 7 to moves out of the lens hood 5, or upon the power switch 11 being turned off, causing the movable barrel 7 to retract into the lens hood 5. When an exposure is made by operating the shutter button 9, and an exposure signal is sent to the controller 86, the controller 86 drives the motor 70 to rotate in the second direction. Thereby, the claw mechanism 78 is caused to make a reciprocative slide to rake out the exposed instant film unit 21, and the developing rollers 27 are rotated to feed out the exposed instant film unit 21 through the film exit 12.

The controller 86 is also receives detection signals from a claw position detector 88 and a barrel position detector 89. The claw position detector 88 sends out the detection signal when the claw mechanism 78 has made the reciprocative slide. Then, the controller 89 stops driving the motor 70. The barrel position detector 89 sends out the detection signal when the movable barrel 7 reaches the stowed position or the protruded position. Then, the controller 89 stops driving the motor 70.

The controller 89 always monitors the operation signal from the rear lid open-close switch 87 to check whether the rear lid 19 is open or closed. If the rear lid 19 is open, the controller 86 ignore the operation signal from the power switch 11 and the operation signal from the shutter button 9 as well. Thus, the motor 7 is not driven in either direction so long as the rear lid 19 is open.

Now the operation of the instant camera 2 will be briefly described.

While the power switch 11 is off, the instant camera 2 is inactive, and the movable barrel 7 is in the stowed position as shown in FIGS. 1 and 3. When the power switch 11 is turned on, the controller 86 drives the motor 70 in the first direction after confirming that the rear lid 19 is closed, the movable barrel 7 is stowed, and the claw mechanism 78 is in an initial position.

The rotation of the motor 70 in the first direction causes the clutch mechanism 73 to switch to the entrance gear 77 for the lens barrel mechanism 28, so that the rotation of the motor 70 is transmitted to the drive gear 36 of the cam barrel 32. As the cam barrel 32 rotates, the movable barrel 7 moves in the axial direction without being rotated because the cam pins 44 and 46 are guided along the axial guide slits 40 and 41. When the cam barrel 32 rotates by the angle θ from the stowed position, the movable barrel 7 moves out by the length L from the stowed position, and the cam pins 44 and 46 enters the second cam groove 51 through the open ends 66 and 68. When the cam barrel 32 rotates 90° from the stowed position, the movable barrel 7 is fully protruded, wherein the cam pins 44 to 47 are located in the position shown in FIG. 6.

The controller 86 monitors the detection signal from the barrel position detector 89, and stops driving the motor 70 when it is determined that the movable barrel 7 reaches the fully protruded position. If the far subject distance zone is selected by the zone selecting device, or the automatic focusing device determines that the subject is located in the far subject distance zone, the controller 86 stops the drive ring 32 when the cam pins 45 and 47 are located in the first segments 55. Thereafter when the shutter button 9 is pressed, the exposure surface 22 of the frontmost instant film unit 21 placed behind the exposure aperture 25 is exposed to an optical image of the subject formed through the taking lens 6. If the subject brightness is lower than a predetermined level, the instant camera 2 projects a flash of light from the flash window 8 toward the subject synchronously with the exposure.

After the exposure, the controller 86 drives the motor 70 in the second direction, so the clutch mechanism 73 is switched to the entrance gear 76, and the rotational movement of the motor 70 is transmitted to the claw mechanism 78 and the developing rollers 27. As a result, the exposed instant film unit 21 is discharged through the film exit 12. While the instant film unit 22 squeezes through the developing rollers 27, the developing solution is developed from the pod over the exposed exposure surface 22. When the claw mechanism 78 slides up and down once, the instant film unit 21 is completely raked out. Therefore, the controller 86 stops driving the motor 70 when the claw position detector 88 detects that the claw mechanism 78 has made one stroke of reciprocative slide.

When the power switch 11 is turned off to terminate the photography, the controller 86 drives the motor 70 to rotate in the first direction. Then, the rotational power of the motor 70 is transmitted to the lens barrel mechanism 28, causing the cam barrel 32 to rotate in the same direction. Since the movable barrel 7 is in the protruded position, the cam pins 44 to 47 are located in the position shown in FIG. 6. By rotating the cam barrel 32 from this position through 90°, the cam pins 45 and 47 move through the first segments 55 and the fifth segments 59 to the fourth segments 58. As the cam pins 45 and 47 move along the obliquely extending fifth segments 59, the movable barrel 7 moves back in the axial direction because of the engagement between the cam pins 44 and 46 and the axial guide slits 40 and 41. When the barrel position detector 89 detects that the movable barrel 7 reaches the stowed position, the controller 86 stops driving the motor 70.

Although the movable barrel 7 is moved cyclically between the stowed position and the protruded position by rotating the cam barrel 32 in one direction in the lens barrel mechanism 28 of the above embodiment, the present invention is applicable to a lens barrel mechanism for a zoom lens which is movable between a stowed position, a wide-angle position and a telephoto position. In that case, the motor 70 is rotated in the first direction upon a zoom button being operated, thereby the zoom lens moves from the stowed position to the wide-angle position and then to the telephoto position. Further operation of the zoom button makes the zoom lens move from the telephoto position back to the wide-angle position and to the stowed position. When the operation on the zoom button stops, the zoom lens stops at the wide-angle position or the telephoto position.

Although the cam barrel 32 of the above embodiment is designed to cause the movable barrel 7 to make two strokes of reciprocative movement between the stowed position and the protruded position while the cam barrel 32 makes one rotation of 360°, it is possible to provide a cam barrel that causes the movable barrel 7 to make one stroke or more than two strokes during the 360° rotation of the cam barrel.

Although the rotational power of the motor 70 in the second direction is used for driving the film feed out mechanism of the instant camera 2 in the above embodiment, the present invention is applicable to a camera for use with a roll film, e.g. a Brownie film, wherein the rotational power of the motor 70 in the second direction may be used for driving a film advancing mechanism for the roll film.

Figure 13:
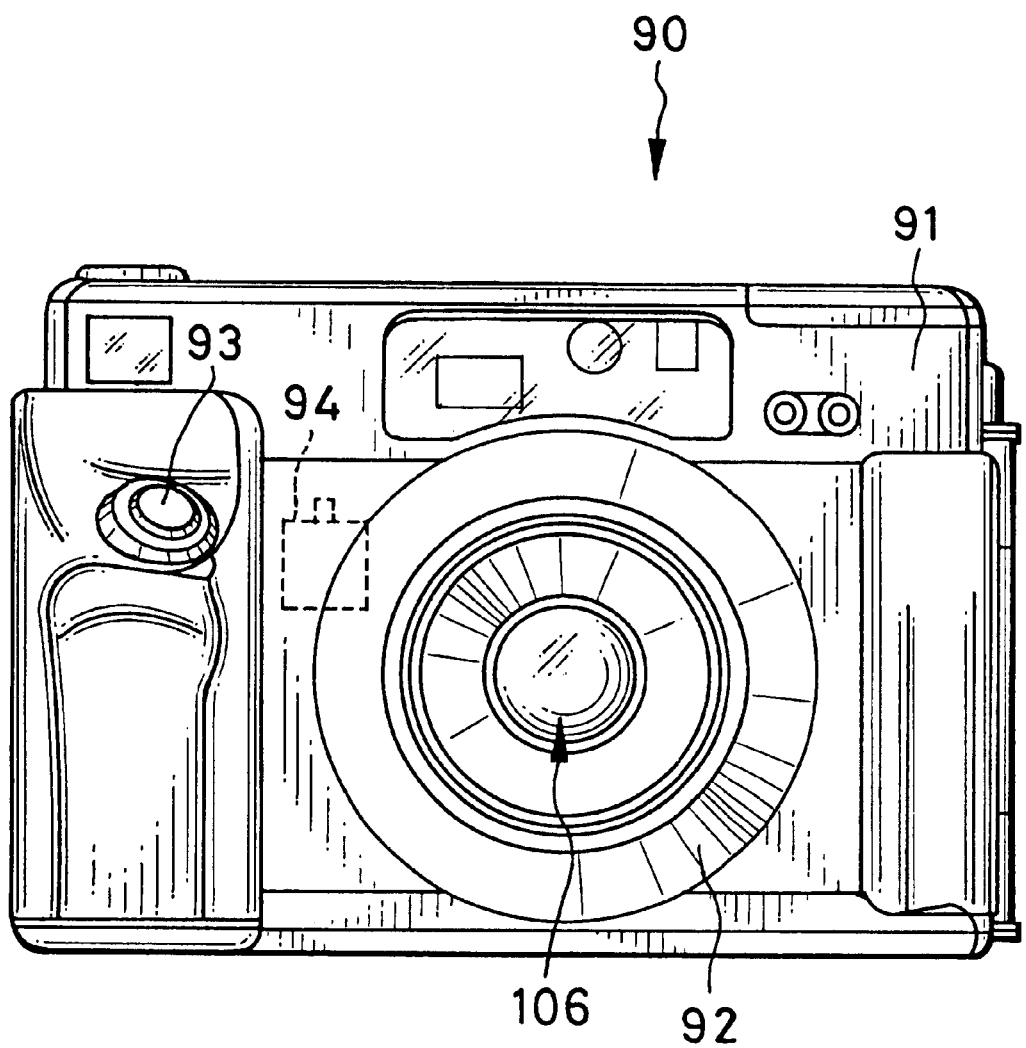
FIG. 13 is a front view of a camera according to a second embodiment of the invention.
Figure 14:
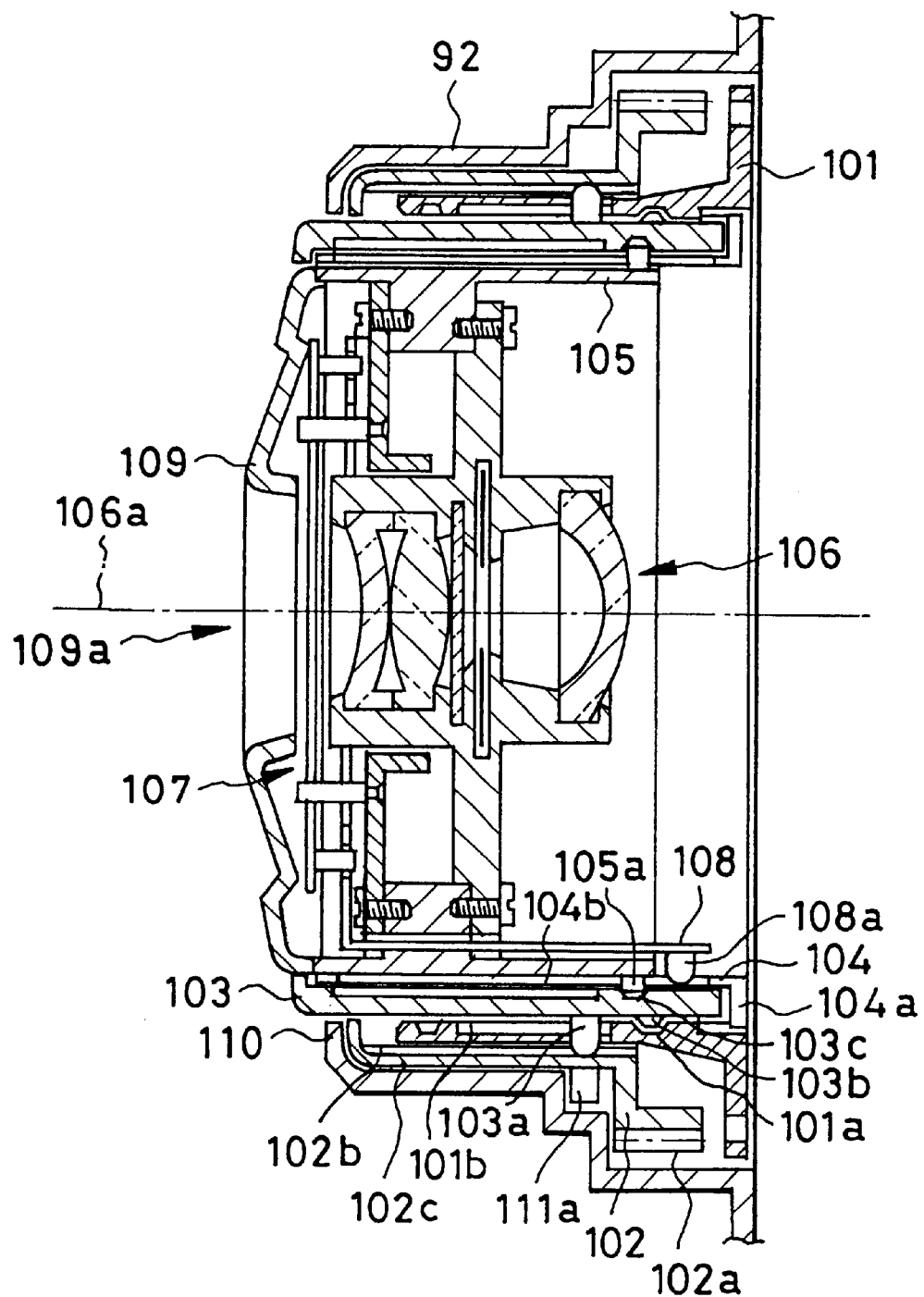
FIG. 14 is an axial sectional view of a lens barrel mechanism of a taking lens at a stowed position, used in the camera of the second embodiment.

FIG. 13 shows a camera 90 according to a second embodiment of the invention. FIG. 14 shows a lens barrel mechanism for a taking lens 106 at a stowed position wherein movable lens barrels 103 and 105 are fully stowed into a lens hood 92 that protrudes forward from a front wall of a camera body 91. The lens barrel 105 holds the taking lens 106 with a between-lens shutter therein, and is mounted movable in the lens barrel 103. The lens barrel 103 is mounted movable in a fixed barrel 100 that is immovable and affixed to the camera body 91. A drive ring 102 is mounted on the outer periphery of the fixed barrel 100 so as to be rotatable about an optical axis 106a of the taking lens 106, but immovable in the axial direction along the optical axis 106a. The drive ring 102 has a drive gear 102a formed around its outer periphery, through which rotational power of a motor 94 (see FIG. 13) is transmitted to the drive ring 102. Also, an axial guide ring 104 is mounted in the movable lens barrel 103 so as to be rotatable but axially immovable relative to the movable lens barrel 103.

Figure 15:
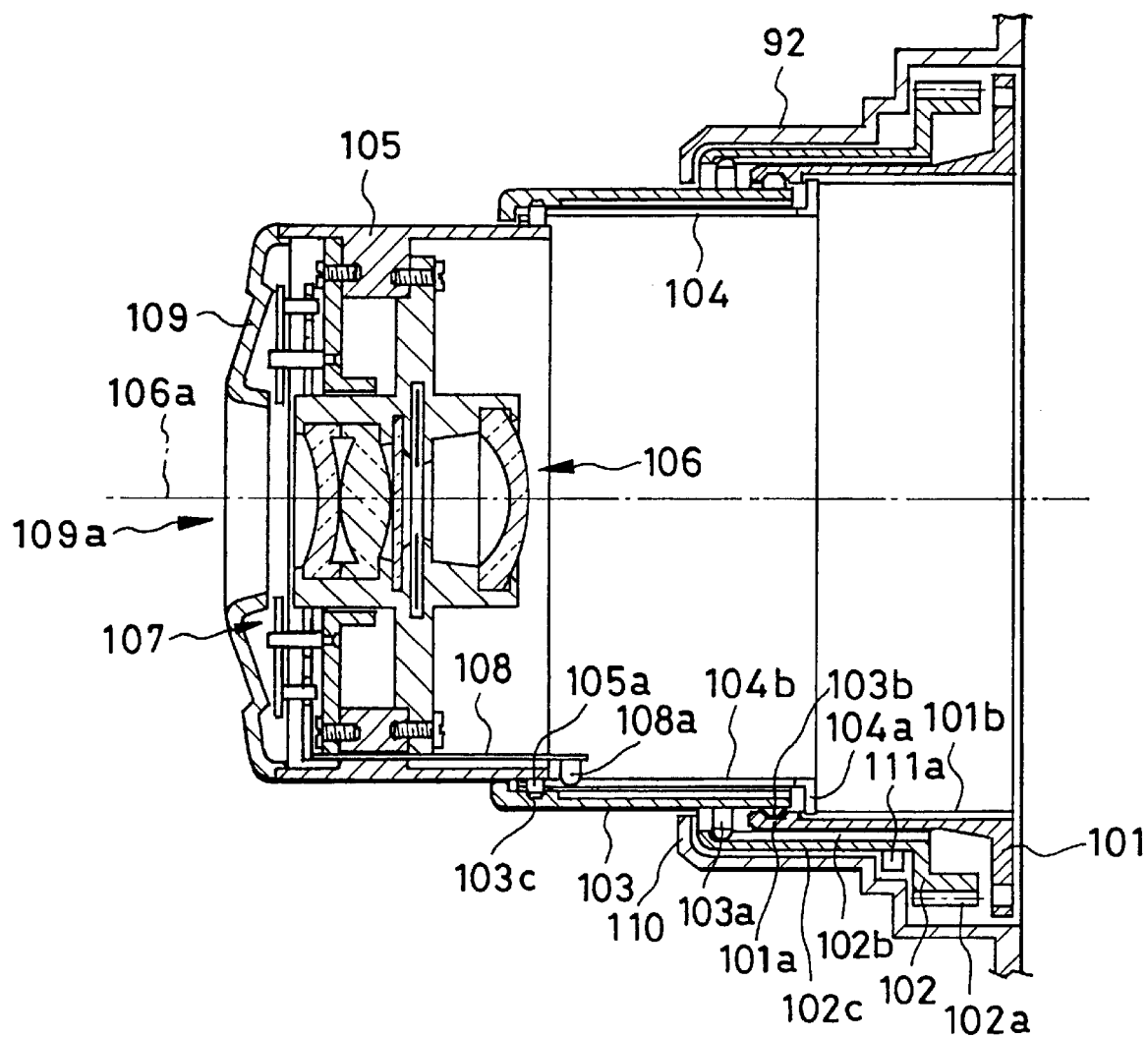
FIG. 15 is an axial sectional view of the lens barrel mechanism of FIG. 14 at a protruded position.

As set forth in detail below, the movable lens barrels 103 and 105 are moved back and forth in the axial direction between the stowed position shown in FIG. 14 and a protruded position shown in FIG. 15 by rotating the drive ring 102 in one direction. Because the lens barrel 105 is protruded forward from the lens barrel 103 in the protruded position, the lens barrel 105 will be called the front movable barrel 105, whereas the lens barrel 103 will be called the rear movable barrel 103.

A lens cover driving device 108 for driving a lens cover 107 to open or close a lens aperture 109a is mounted securely to the front movable barrel 105. A front cover plate 109 having the lens aperture 109a is secured to the front end of the front movable barrel 105.

Figure 16:
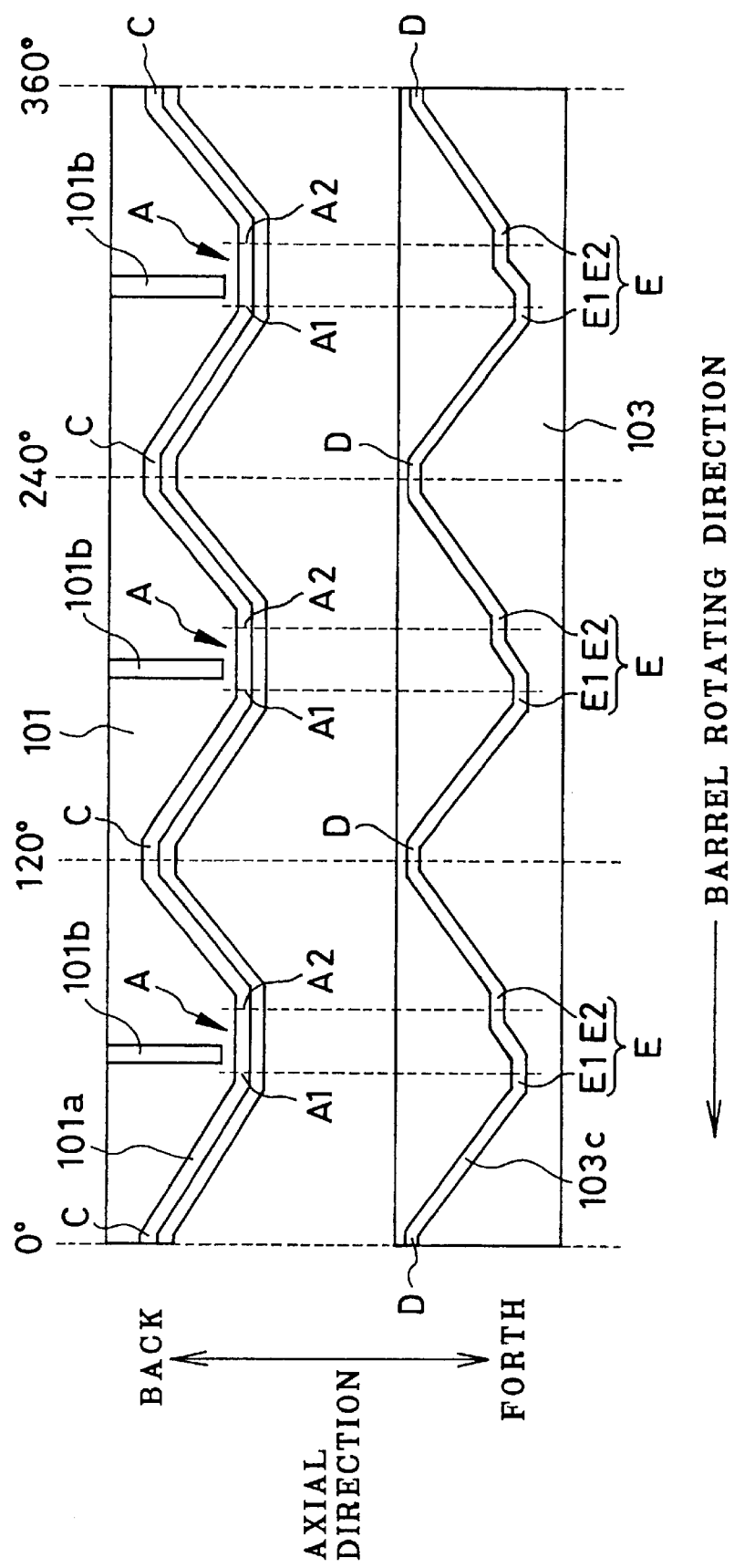
FIG. 16 is an unfolded view of a fixed barrel and a rear movable barrel of the lens barrel mechanism of FIG. 14, illustrating cam grooves formed around inner peripheries of the barrels.

The fixed barrel 100 has an endless cam groove 101a and three axial guide grooves 101b formed in its inner periphery, as shown in detail in FIG. 16. The axial guide grooves 101b are spaced by 120° from each other with respect to the optical axis 6a. The axial guide ring 104 has three key pins 104a formed on its rear end and spaced by 120° from each other around its outer periphery. The axial guide ring 104 also has three axial guide slits 104a formed therethrough at intervals of 120° with respect to the optical axis 6a. The key pins 104a are engaged in and slidable along the axial guide grooves 101b of the fixed barrel 101. The drive ring 102 has three axial grooves 102b formed in its inner periphery at intervals of 120°.

On the outer periphery of the rear movable barrel 103, there are three coupling pins 103a and three cam pins 103b. The coupling pin 103a are spaced by 120° from each other, and are engaged in and slidable along the axial grooves 102b of the drive ring 102. The cam pins 103b are also spaced by 120° from each other, and are engaged in and slidable along the cam groove 101a of the fixed barrel 101. The rear movable barrel 103 further has an endless cam groove 103c around its inner periphery, as shown in detail in FIG. 16. Because of the engagements between the cam groove 101a and the cam pins 103b, between the axial guide grooves 101b and the key pins 104a, and between the axial grooves 102b and the coupling pins 103a, the rear movable barrel 103 and thus the axial guide ring 104 are moved back and forth relative to the fixed barrel 101 by rotating the drive ring 102.

The front movable barrel 101 has three cam pins 105a formed around its outer periphery at intervals of 120°, which are engaged in the cam groove 103c of the rear movable barrel 103 through the axial guide slits 104b of the axial guide ring 104. The lens cover driving device 108 has three guide pins 108a on its rear end, which are engaged in the axial guide slits 104b of the axial guide ring 104. Because of the engagement between the cam pins 105a and the cam groove 103c through the axial guide slits 104b, and between the guide pins 108a and the axial guide slits 104b, the front movable barrel 105 is moved back and forth relative to the rear movable barrel 103, without rotating on its own axis that coincides with the optical axis 6a.

According to this embodiment, the cam groove 101a and the axial guide grooves 101b of the fixed barrel 101, the axial grooves 102b of the drive ring 102, the coupling pins 103a and the cam pins 103b of the rear movable barrel 103, and the key pins 104a of the axial guide ring 104 constitute a cam mechanism for the rear movable barrel 103. On the other hand, the cam groove 103c of the rear movable barrel 103, the axial guide slits 104b of the axial guide ring 104, the cam pins 105a of the front movable barrel 105, and the guide pins 108a of the lens cover driving device 108 constitute a cam mechanism for the front movable barrel 105. The axial guide ring 104, the front and rear movable barrels 105 and 103, the taking lens 106 with the between-lens shutter and other members mounted in the front movable barrel 105 constitute a movable barrel assembly, whereas the drive ring 102 and the fixed barrel 101 constitute a barrel driving assembly.

When the movable barrels 103 and 105 are in the stowed position shown in FIG. 14, the cam pins 103b of the rear movable barrel 103 are located at rearmost points C of the cam groove 101a of the fixed barrel 101, and the cam pins 105a of the front movable barrel are located at rearmost points D of the cam groove 103c of the rear movable barrel 103. As the drive ring 102 rotates in the direction indicated by an arrow in FIG. 16, the rear movable barrel 103 rotates in the same direction because of the engagement between the coupling pins 103a of the rear movable barrel 103 and the axial grooves 102b of the drive ring 102. Then, the cam pins 103b move from the rearmost points C toward front segments A of the cam grooves 101a, causing the rear movable barrel 103 to move forth while rotating. As the rear movable barrel 103 moves forth, the axial guide ring 104 moves forth without rotating, because the key pins 104a are engaged in the axial guide grooves 101b of the fixed barrel 101. Since the cam pins 105a of the front movable barrel 105 are engaged in the cam groove 103c of the rear movable barrel 103 through the axial guide slits 104b of the axial guide ring 104, and also the guide pins 8a are engaged in the axial guide slits 4b, the cam pins 105a move from the rearmost points D toward front segments E of the cam groove 103c while the cam pins 103b move from the rearmost points C to the front segments A. As a result, the front movable barrel 105 moves forth without rotating.

The front segment E of the cam groove 103c is divided into a frontmost segment E1 and a second front segment E2. When the cam pins 103b reach the front segments A of the cam groove 101a, the cam pins 105a reach the frontmost segments E1 of the cam groove 103c. In this position, the rear and front movable barrels 103 and 105 protrude fully from the lens hood 92, as shown in FIG. 15. In the fully protruded position, the taking lens 106 is set at a near distance focusing position where the focal point of the taking lens 106 is in a near subject distance zone. By rotating the drive ring 102 further in the same direction till the cam pins 105a move in second front segments E2 adjacent to the frontmost segments E1 of the cam groove 103c, the front movable barrel 105 moves a little back, while the rear movable barrel 103 stays in its fully protruded position because the cam pins 103b just move along the front segments A. Where the cam pins 105a are in the second front segments E2, the taking lens 106 is set to a far distance focusing position where the focal point of the taking lens 106 is in a far subject distance zone. Accordingly, the focal point of the taking lens 106 is adjustable by rotating the drive ring 102 in the same direction.

By rotating the drive ring 102 further in the same direction, the cam pins 103b and 105a move toward the rearmost points C and D. According to the present embodiment, the movable barrels 103 and 105 make three strokes of reciprocative movement between the stowed position and the protruded position while the drive ring 102 makes one revolution.

Figure 17:
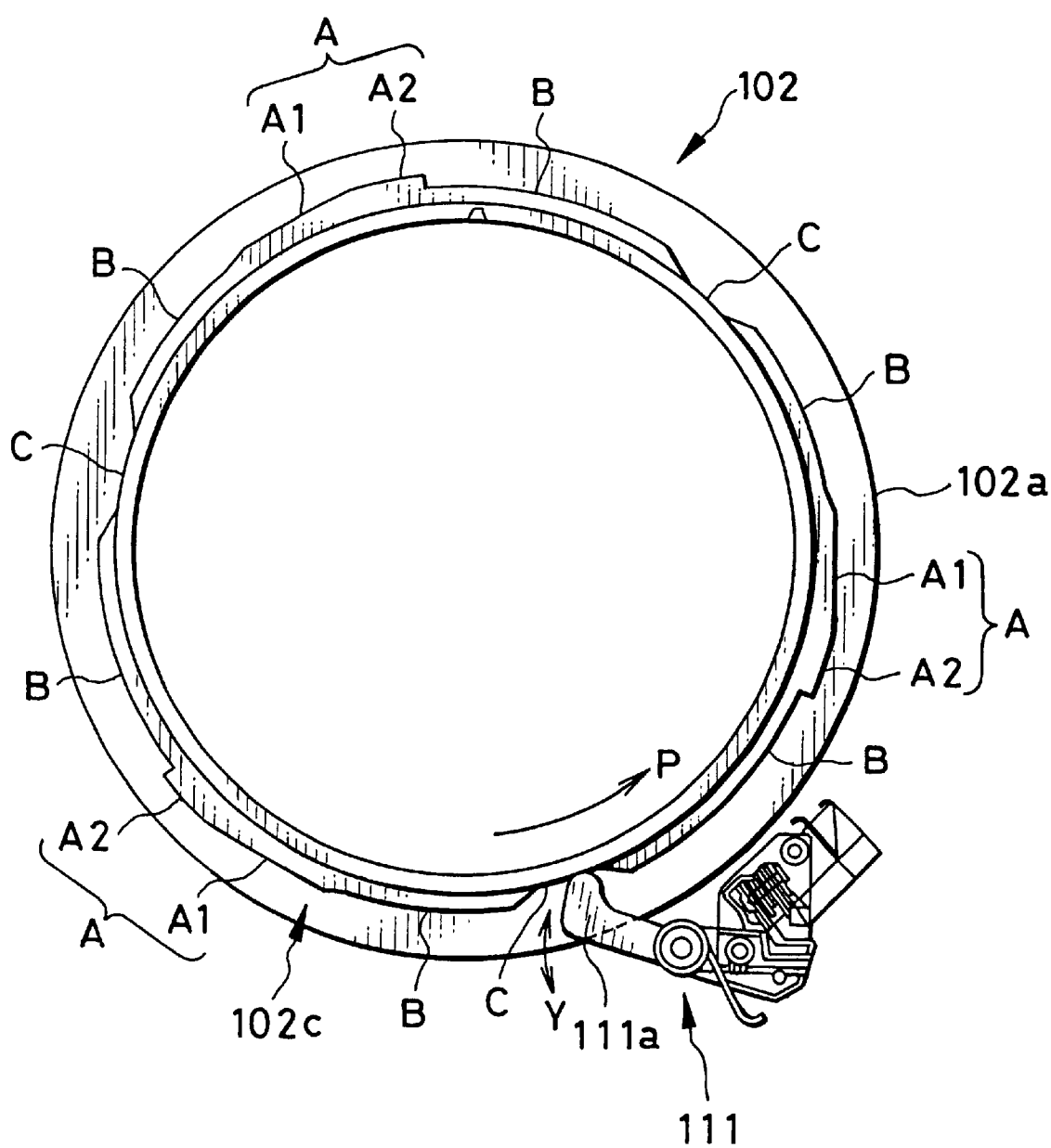
FIG. 17 is an explanatory diagram illustrating a cam surface provided around a drive ring of the lens barrel mechanism of FIG. 14, and a barrel position detector detecting rotational position of the drive ring from the contour of the cam surface.

To start and stop driving the motor 94 to position the lens barrel mechanism appropriately, the rotational position of the drive ring 102 and thus the axial positions of the movable barrels 103 and 105 are detected by a barrel position detector 111 as shown in FIG. 17. The barrel position detector 111 has a lever 111a that can swing as shown by an arrow Y, and is urged in a clockwise direction in FIG. 17, so a distal end of the lever 111a is kept in contact with a cam surface 102c that is formed around the outer periphery of the drive ring 102. The cam surface 102c is divided into three sections having the same contour and the same angular range of 120°. Each section consists of four segments A1, A2, B and C having different height in the radial direction of the drive ring 102.

The segment A1 is the highest among the cam surface 102c, and its angular position corresponds to the near distance focusing position, wherein the movable barrels 103 and 105 are fully protruded, and the cam pins 103b and 105a are located in the front segments A and E1 of the cam grooves 101a and 103c respectively. The correspondence is implied by a dashed line A1 in FIG. 16. The segment A2 is lower than the segment A1, and its angular position corresponds to the far distance focusing position, wherein the cam pins 105a are located in the second front segments E2, whereas the cam pins 103b are located in the front segments A, as implied by a dashed line A2 shown in FIG. 16. The segment B is lower than the segment A2, and its angular position corresponds to a transitional position between the stowed position and the protruded position of the lens barrel mechanism. The segment C is the lowest among the cam surface 102c, and its angular position corresponds to the stowed position wherein the cam pins 103b and 105a are located in the rearmost points C and D of the cam grooves 101a and 103c.

As the drive barrel 102 rotates in the predetermined direction shown by an arrow P in FIG. 17, the lever 111a of the barrel position detector 111 moves in the direction Y by different amounts in accordance with the change in height of the cam surface 102c. According to the rotational position of the lever 111a, the barrel position detector 111 outputs different detection signals, so it is possible to control driving the motor 94 to stop the lens barrel mechanism at the stowed position or the near distance focusing position or the far distance focusing position with reference to the detection signals from the barrel position detector 111.

The lens cover driving device 8 drives the lens cover 107 in cooperation with the movement of the movable barrels 103 and 105, such that the lens cover 107 opens the lens aperture 109a as the front movable barrel 105 is protruded, and closes the lens aperture 109a when the front movable barrel 105 is stowed.

Figure 18:
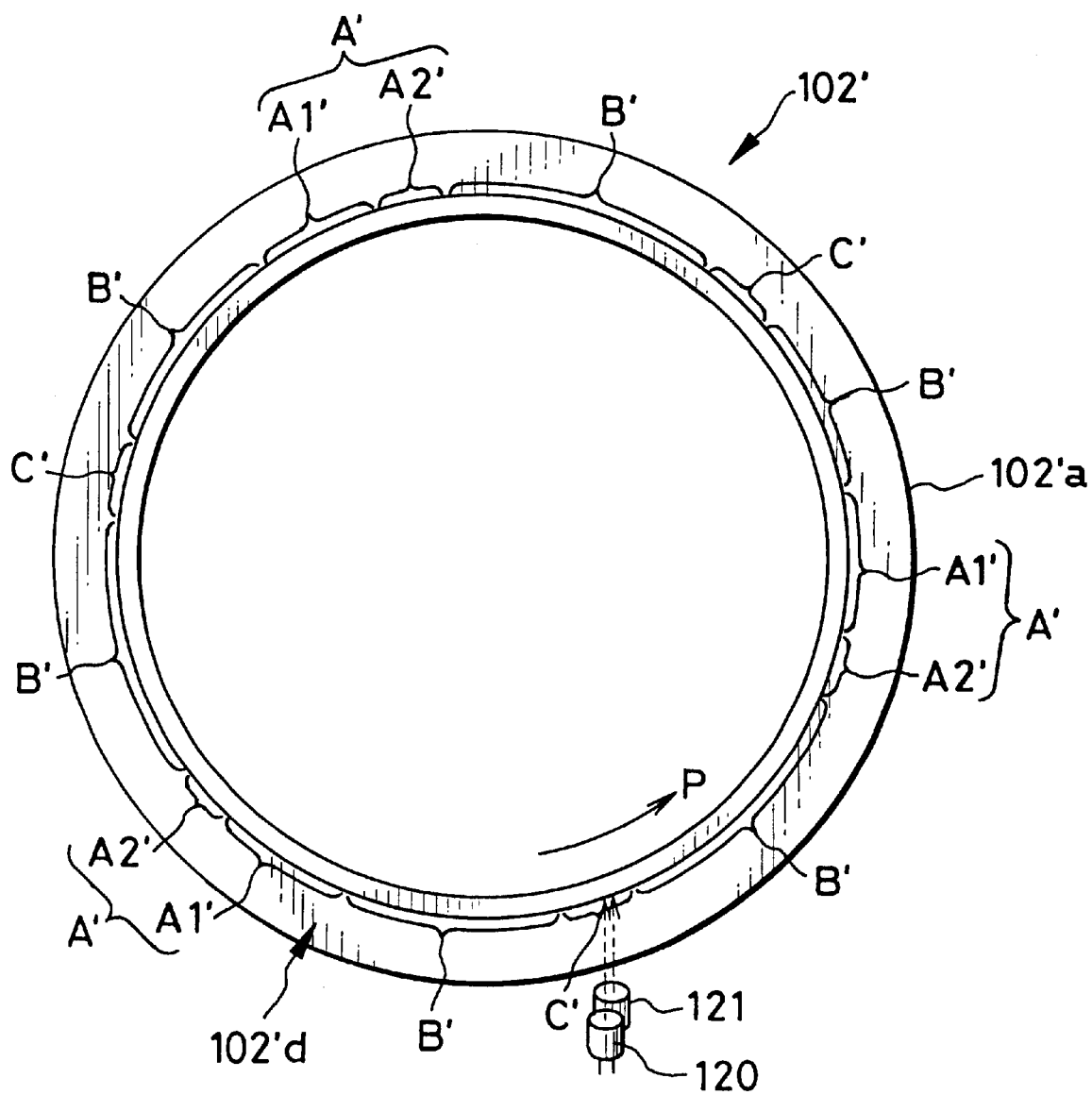
FIG. 18 is an explanatory diagram illustrating a drive ring and a barrel position detector according to another embodiment, wherein rotational position of the drive ring is determined based on optically detected patterns provided on the outer periphery of the drive ring.

In the above embodiment, the rotational position of the drive ring 102 is detected by providing the cam surface 102c around the drive ring 102 in correspondence with the cam grooves 101a and 103c in order to determine the axial positions of the movable barrels 103 and 105. It is alternatively possible to use another barrel position detector as shown for example in FIG. 18. In this embodiment, a drive ring 102' does not have a cam surface on its outer periphery 102'd besides a ring gear 102'a. Instead, different patterns consisting of anti-reflection blocks 102g are provided, e.g. printed, on different angular segments A1', A2', B' and C' of the outer periphery 102'd. In the same way as the embodiment of FIG. 17, the outer periphery 102'd of the drive ring 102' is divided into three sections in the circumferential direction, and the segments A1', A2', B' and C' are provided in each section in correspondence with the segments of the cam grooves 101 and 103 the cam pins 103b and 105a of the movable barrels 103 and 105 move in as the drive ring 102' rotates. A pair of photo sensors 120 and 121 are provided near the outer periphery 102'd of the drive ring 102, for detecting the anti-reflection blocks 102g by projecting light beams on the outer periphery 102'd and measuring intensity of reflected light. The photo sensors 120 and 121 are arranged side by side in the axial direction of the drive ring 102'.

Figure 19A:
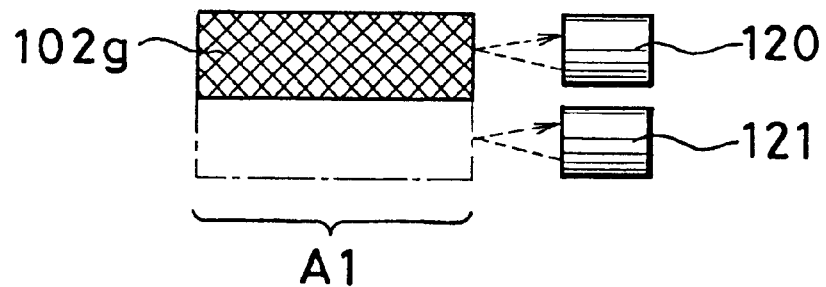
FIGS. 19A, 19B and 19C are explanatory diagrams illustrating differences in the optically detected patterns provided in different angular segments.
Figure 19B:
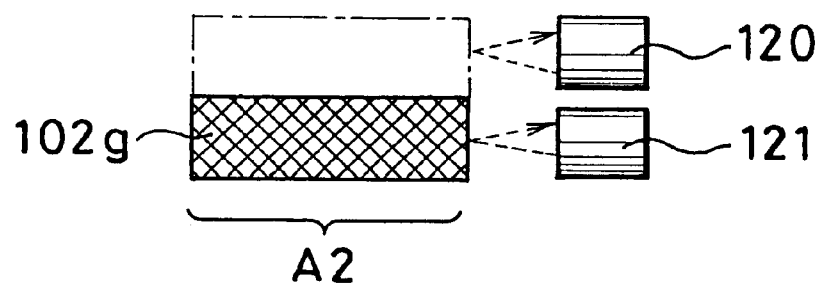
Figure 19C:
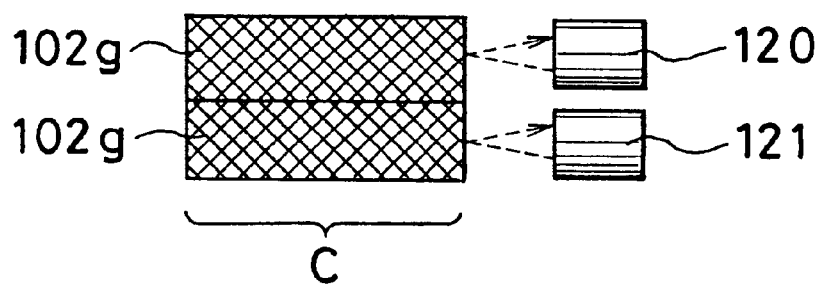

As shown in FIGS. 19A and 19B, the segment A1 has one anti-reflection block 102g in opposition to the first photo sensor 120, whereas the segment A2 has one anti-reflection block 102g in opposition to the second photo sensor 121. Therefore, the first photo sensor 120 detects weaker light than the second photo sensor 121 when the segment A1 passes by, whereas the first photo sensor 120 detects stronger light than the second photo sensor 121 when the segment A2 passes by. On the other hand, as shown in FIG. 19C, the segment C has two anti-reflection blocks 102g in opposition to the two photo sensors 120 and 121, so the photo sensors 120 and 121 both detect weaker light when the segment C passes by. The remaining segment B does not have any anti-reflection block 102g, so the photo sensors 120 and 121 both detect stronger light when the segment B passes by. Accordingly, the rotational position of the drive ring 102 and thus the axial positions of the movable barrels 103 and 105 are determined by the combination of light intensity received by the photo sensors 120 and 121.

Although the positions of the movable barrels 103 and 105 in the axial direction are determined by detecting rotational position of the drive ring 102 in the above embodiments, it is possible to detect the axial position of the front movable barrel 105 directly by an appropriate device, or indirectly through the rotational position of the motor 94 detected by a rotary encoder or the like.

Figure 20:
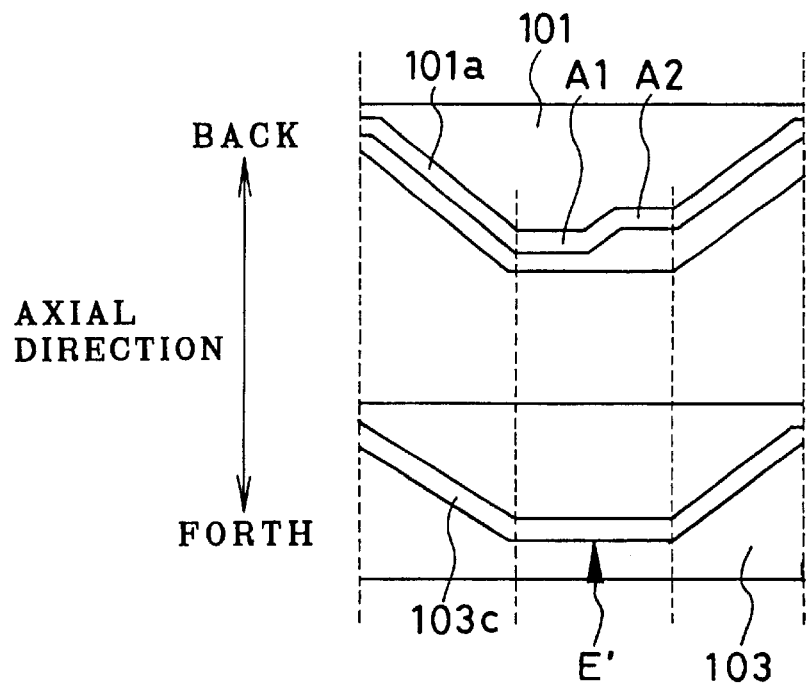
FIG. 20 is an unfolded fragmentary view of a fixed barrel and a rear movable barrel as a modification to the embodiment of FIG. 16.

Although the front segment E of the cam groove 103c of the rear movable barrel 103 is divided into the frontmost segment E1 and the second front segment E2 in order to provide the near distance focusing position and the far distance focusing position in the lens barrel mechanism shown in FIG. 16, the same effect is obtained by substituting a frontmost segment A1 and a second front segment A2 for the front segment A in the cam groove 101a of the fixed barrel 101, while providing only a frontmost segment E' in place of the frontmost segment E1 and the second front segment E2 in the cam groove 103, as shown in FIG. 20.

Figure 21:
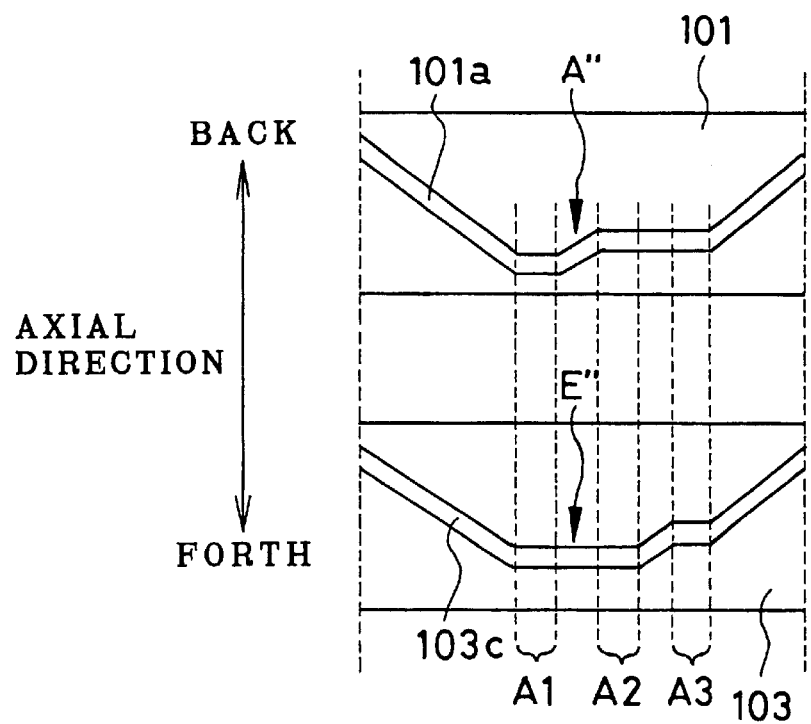
FIG. 21 is an unfolded fragmentary view of a fixed barrel and a rear movable barrel as another modification to the embodiment of FIG. 16.

By providing two steps in each of front segments A" and E" of the cam grooves 101a and 103c and shifting the stepped positions of the front segments A" and E", as shown in FIG. 21, the front movable barrel 103 may be protruded to three different positions as implied by A1, A2 and A3 in FIG. 21. In that case, the camera 90 has three different focusing positions, e.g., for a near subject distance zone, a middle subject distance zone, and a far subject distance zone.

Figure 22:
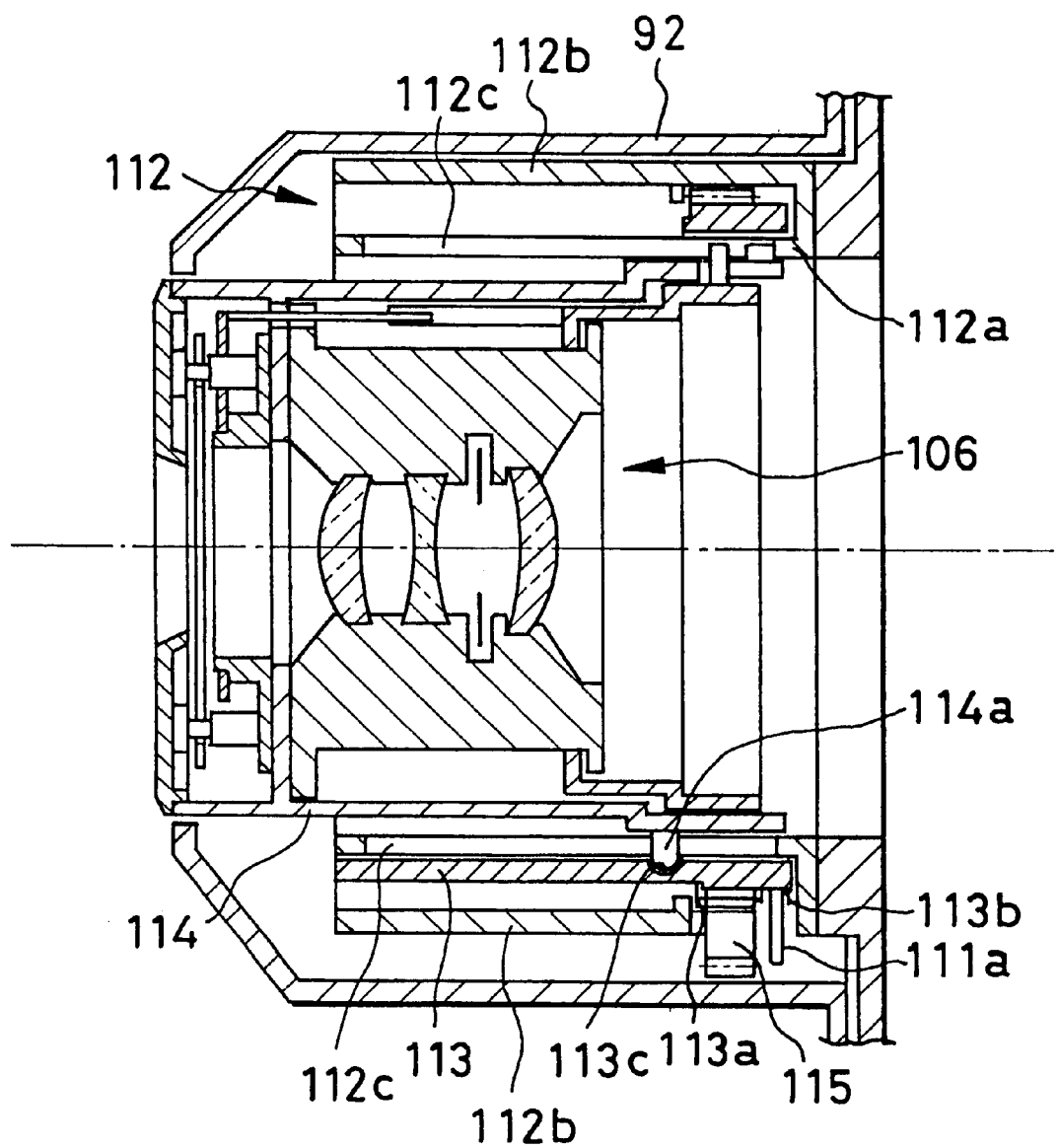
FIG. 22 is an axial sectional view of a lens barrel mechanism according to another embodiment of the invention at a stowed position.
Figure 23:
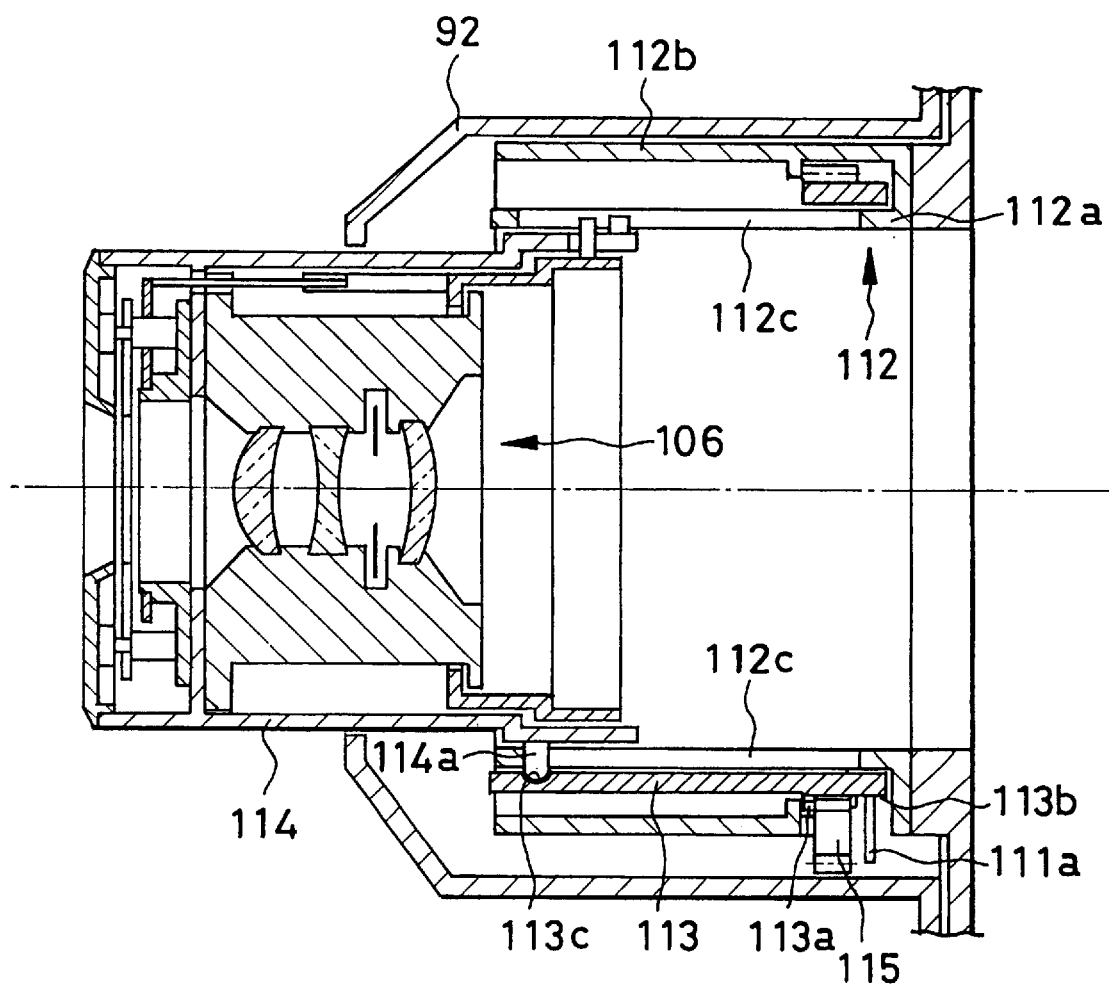
FIG. 23 is an axial sectional view of the lens barrel mechanism of FIG. 22 at a protruded position.
Figure 24:
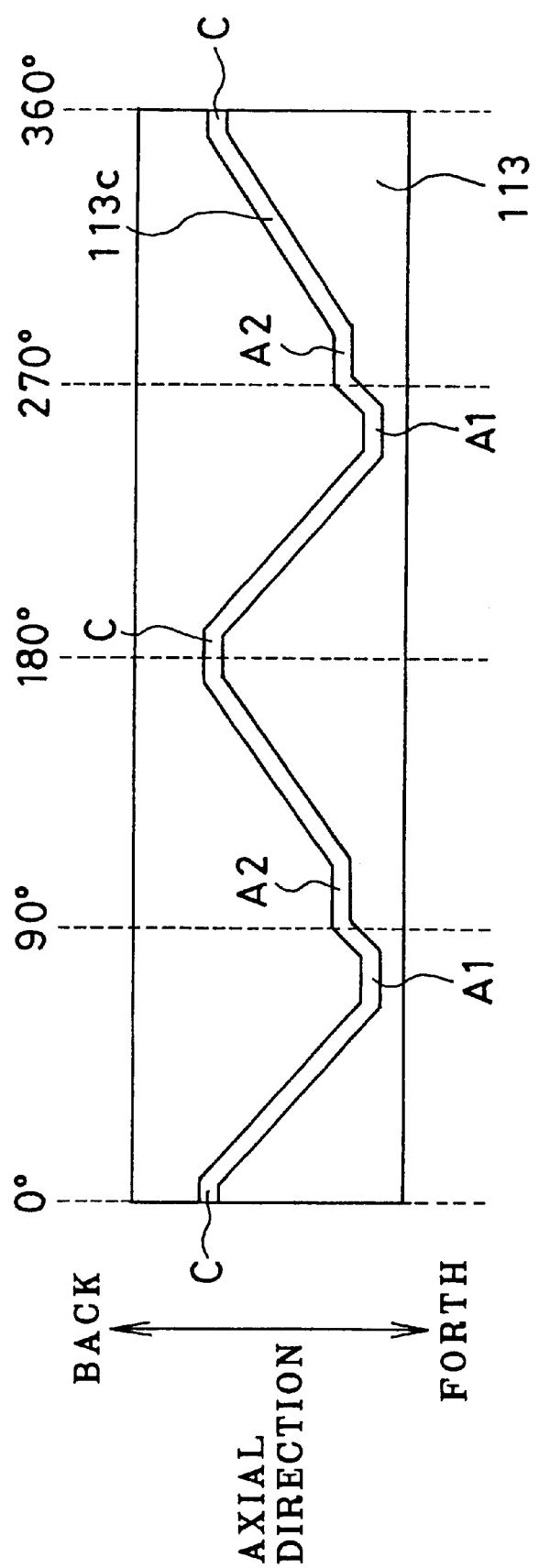
FIG. 24 is an unfolded view of a drive ring of the lens barrel mechanism of FIG. 22, illustrating a cam groove formed around the drive ring.

FIGS. 22 and 23 show a lens barrel mechanism according to another embodiment of the invention, consisting mainly of a fixed barrel 112, a drive ring 113 and a movable barrel 114. A taking lens 106 is held in the movable barrel 114. The fixed barrel 112 has an inner barrel 112a and an outer barrel 112b surrounding the inner barrel 112a. Two axial slits 112c are formed through the inner barrel 112a which are spaced by 180° from each other. A drive ring 113 is fitted in between the inner and outer barrels 112a and 112b, so as to be rotatable but axially immovable relative to the fixed barrel 112. The drive ring 113 has a ring gear 113a and a cam surface 113b around its outer periphery. The ring gear 113a is engaged with a drive gear 115 that is rotated by a rotational power of a motor in one direction. The cam surface 113b is followed by a lever 111a of a position detector in the same way as the embodiment shown in FIG. 17. The drive ring 113 further has a cam groove 113c as shown in detail in FIG. 24. Two cam pins 114a formed on an outer periphery of the movable barrel 114 at an interval of 180° are engaged in the cam groove 113c through the axial slits 112c of the inner barrel 112a of the fixed barrel 112.

This configuration also enables the movable barrel 114 to move back and forth in the axial direction as the drive ring 112 is rotated in one direction. Specifically, the movable barrel 114 moves from a stowed position shown in FIG. 22 to a fully protruded position shown in FIG. 23 as the cam pins 113b move from rearmost segments C to front most segments A1 of the cam groove 113c with the rotational movement of the drive ring 112. Also in this embodiment, the fully protruded position corresponds a near distance focusing position. When the drive ring 112 is rotated further from the fully protruded position of the movable barrel 114 to bring the cam pins 114a to second front segments A2 of the cam groove 113c, the movable barrel 114 is moved a little back, wherein the taking lens 106 is set to a far distance focusing position.

By rotating the drive ring 112 through 180°, the movable barrel 114 makes one stroke of reciprocative movement between the stowed position and the fully protruded position. According to this embodiment, the movable barrel 114 and those elements moving in the axial direction together with the movable barrel 114, including the taking lens 106, constitute a movable barrel assembly, whereas the drive ring 113 and the fixed ring 112 constitute a barrel driving assembly.

It is also possible to protrude the movable barrel 114 in three or more steps by providing a third or more front segment in addition to the frontmost and second front segments A1 and A2.

Since the drive ring 102 or 112 has to rotate only in one direction for protrusion and retraction of the movable barrels 103 and 105 or 114 as well as for focusing the taking lens 106, it is possible to utilize the rotational power of the motor 94 in the opposite direction for driving another mechanism.

Figure 25:
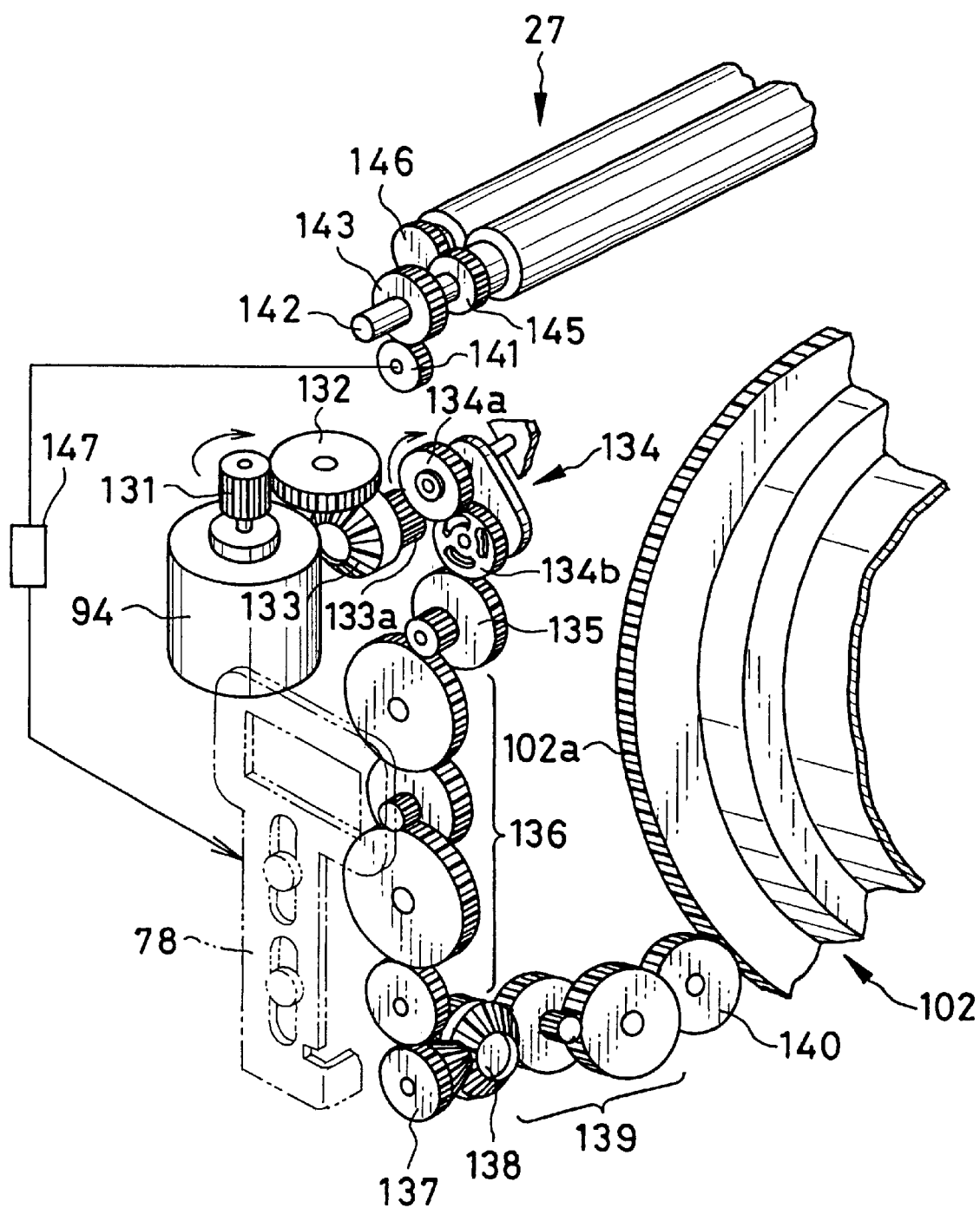
FIGS. 25 and 26 are explanatory diagrams illustrating mechanisms provided in the camera of FIG. 13, for transmitting rotational power of a motor either to a lens barrel mechanism or to a film feed out mechanism.
Figure 26:
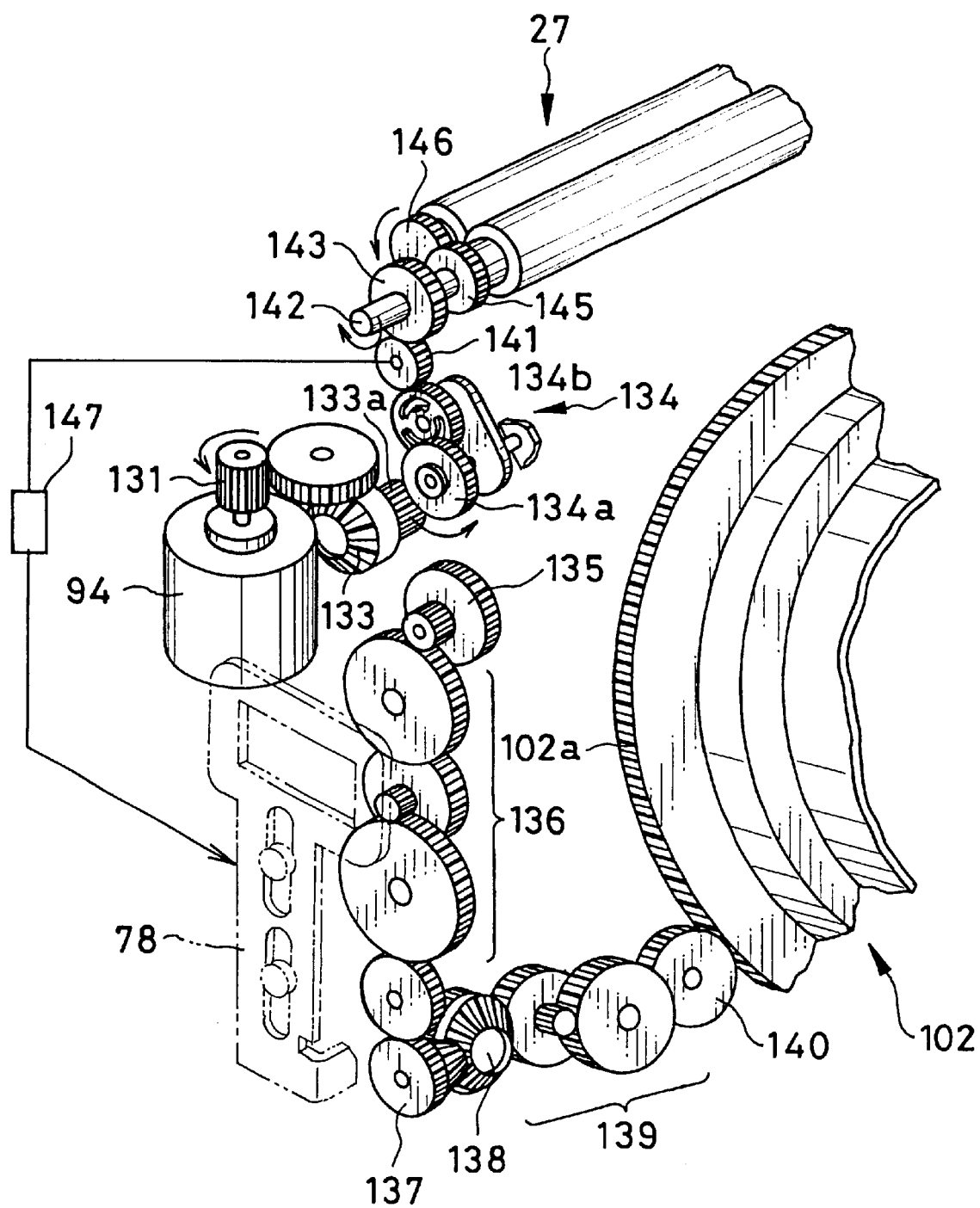

FIGS. 25 and 26 show an embodiment of clutch mechanism for transmitting the rotational power of the motor 94 either to the drive ring 102 or to a film feed out mechanism of the camera 90 according to the rotational direction of the motor 94, on the assumption that the camera 90 is an instant camera. The film feed out mechanism consists of a claw mechanism 78 and a pair of developing rollers 27. The rotational power of the motor 94 in a clockwise direction in FIG. 22 is transmitted through a motor gear 131, bevel gears 132 and 133 to a planetary gear mechanism 134. A sun gear 134a of the planetary gear mechanism 134 rotates in the clockwise direction as the motor 94 rotates in the clockwise direction. Then, a planet gear 134b is engaged with a coupling gear 135. The coupling gear 135 is coupled through a reduction gear train 136, bevel gears 137 and 138, a reduction gear train 139 and a coupling gear 140 to the ring gear 102a of the drive ring 102. Thus, the drive ring 102 is rotated by the clockwise rotation of the motor 94.

When the motor 94 is rotated counterclockwise as shown in FIG. 23, the sun gear 134a also rotates in the counterclockwise direction, so the planet gear 134b is engaged with a coupling gear 141. The coupling gear 141 is coupled through gears 142, 143, 145 and 146 to the developing rollers 27. Thus, the developing rollers 27 rotate in opposite directions from each other as shown by arrows to feed out an exposed instant film, in the same way as described with respect to the first embodiment. The rotational movement of the coupling gear 141 is also transmitted to the claw mechanism 78 through a transmission mechanism 147, thereby driving the claw mechanism 78 to rake out the exposed instant film toward the developing rollers 27. In this way, the rotational power of the motor 94 is alternatively used for driving the lens barrel mechanism and the film feed out mechanism according to the rotational direction of the motor 94.

Figure 27:
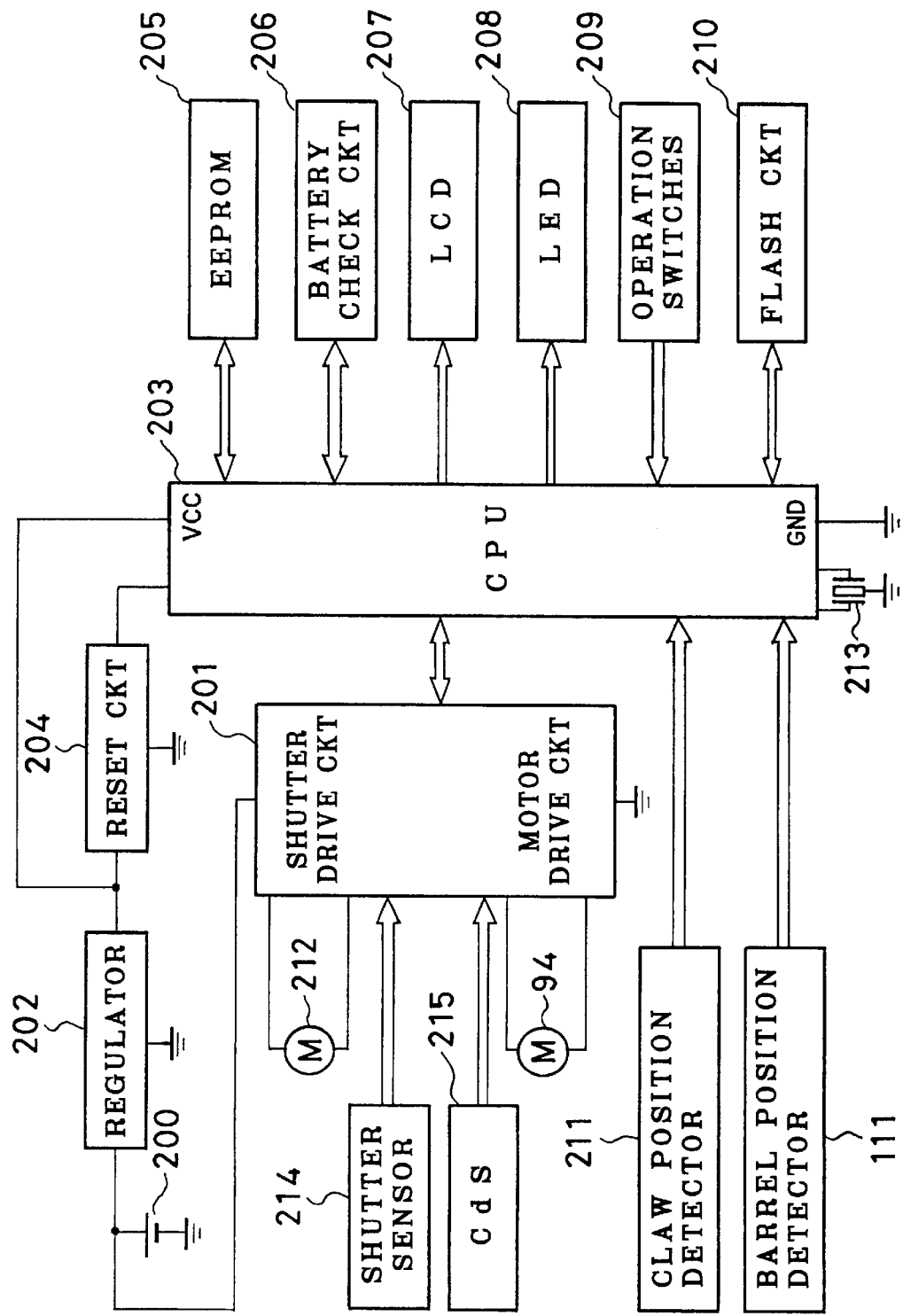
FIG. 27 is a block diagram illustrating a circuitry of the camera of FIG. 13.

FIG. 27 shows an example of control circuit of the above described instant camera 90.

A built-in battery 200 supplies electric power directly to a driver IC 201, and through a regulator 202 to a CPU 203. The regulator 202 stabilizes the electric power. A reset circuit 204 monitors voltage output from the regulator 202 to check if the output voltage goes below a minimum voltage necessary for normal operation of the CPU 203. If the output voltage goes below the minimum voltage, the reset circuit 204 deactivates the CPU 203 to prevent malfunction of the camera 90. To the CPU 203 is connected an EEPROM 205 storing various programs and fixed data necessary for effecting the programs, a battery check circuit 206 for monitoring remaining capacity of the battery 200, a liquid crystal display (LCD) 207, a light emitting diode (LED) 208 as an indicator, and operation switches 209. The operation switches 209 include a power switch, a release switch operated by the shutter button 93, and manually operated switches of a zone selecting device. Also, a flash circuit 210, a claw position detector 211 for detecting the movement of the claw mechanism 78, the barrel position detector 111, a crystal resonator 213 for generating a fundamental clock signal are connected to the CPU 203. The driver IC 201 is connected to the CPU 203, and drives the motor 94 and a second motor 212 under the control of the CPU 203.

The second motor 212 is for driving the between-lens shutter. The driver IC 201 includes a motor drive circuit for driving the motor 94, and a shutter drive circuit for driving the motor 212. A shutter sensor 214 for detecting when the shutter starts opening, and a CdS sensor 215 for detecting subject brightness are connected to the driver IC 201. The shutter drive circuit of the driver IC 201 starts driving the motor 212 upon a command from the CPU 203, to open the shutter for a time determined by the subject brightness that is detected through the CdS sensor 215.

The motor drive circuit of the driver IC 201 supplies a positive drive current or a negative drive current to the motor 94 to rotate it in first and second directions respectively. In the present embodiment, the rotational power of the motor 94 in the first direction is transmitted to the drive ring 102, whereas the rotational power in the second direction is used for driving the film feed out mechanism.

The motor 94 starts being driven to rotate in the first direction for rotating the drive ring 102 when the power switch is turned on, and stops rotating in the first direction when the taking lens 106 is set to the near distance focusing position. If the photographer selects the far subject distance zone through the zone selecting device, the motor 94 is driven to set the taking lens 106 to the far distance focusing position.

When the power switch is turned off, the motor 94 is driven in the first direction. Thereby, the cam pins 103b move from the front segments A to the rearmost points C of the cam groove 101a, and simultaneously the cam pins 105a move from the front segments E to the rearmost points D of the cam groove 103c. When the cam pins 103b and 105a reach the rearmost points C and D, the motor 94 stops, thereby setting the movable barrels 103 and 105 in the stowed position shown in FIG. 14.

As described so far, according to the camera 90 of the second embodiment, not only the protrusion and retraction of the movable lens barrels 103 and 105 but also switching between different focusing positions as well as opening and closing movement of the lens cover 107 are performed by rotating the motor 94 in one direction.

Although the operation of the camera 90 has been described on the assumption that the camera 90 is provided with the manually operated zone selecting device, it is possible to provide an automatic focusing device instead of or in addition to the zone selecting device.

As described with respect to the prior arts, torque necessary for driving a mechanism and appropriate driving speed vary depending upon the mechanism, so that it is necessary to adjust the rotational power or driving power of the motor 94 according to that difference when using the same motor 94 for driving different mechanisms.

According to an embodiment shown in FIGS. 28A and 28B, the positive drive current for driving the motor 94 in the first direction and thus for rotating the drive ring 102 is intermittently supplied to the motor 94, whereas the negative drive current for driving the film feed out mechanism is supplied continuously to the motor 94. In this embodiment, the positive drive current and the negative drive current have the same magnitude M. The magnitude M is determined such that the motor 94 applies an appropriate rotational power to the film feed out mechanism when being supplied with the negative drive current continuously.

By supplying the positive drive current intermittently, the electric power supplied per unit time to the motor 94 for the rotation in the first direction is reduced in comparison with that for the rotation in the second direction, so that an appropriately reduced rotational power is applied to the drive ring 102. By reducing the power of the motor 94 to a level enough for giving a sufficient torque to the lens barrel mechanism, the noise is remarkably reduced and the mechanisms work stably.

As described above, the start and stop of driving the motor 94 in the first direction is controlled with reference to the detection signal from the barrel position detector 111. Although the barrel position detector 111 outputs different detection signals according to the rotational position of the drive ring 102 in the above embodiment, the detection signal of the barrel position detector 111 is just shown as an ON-OFF signal in FIG. 28A for brevity sake, and the ON state of the detection signal represents that the drive ring 102 moves in one of predetermined rotational positions.

On the other hand, the output signal from the claw position detector 212 changes from an ON state to an OFF state when the negative drive current starts being supplied to the motor 94, and returns to the ON state again when the claw mechanism 78 makes one stroke of reciprocative movement to rake out the exposed instant film. Upon the output signal from the claw position detector 212 returning to the ON state, the power supply to the motor 94 is terminated.

Figure 29:
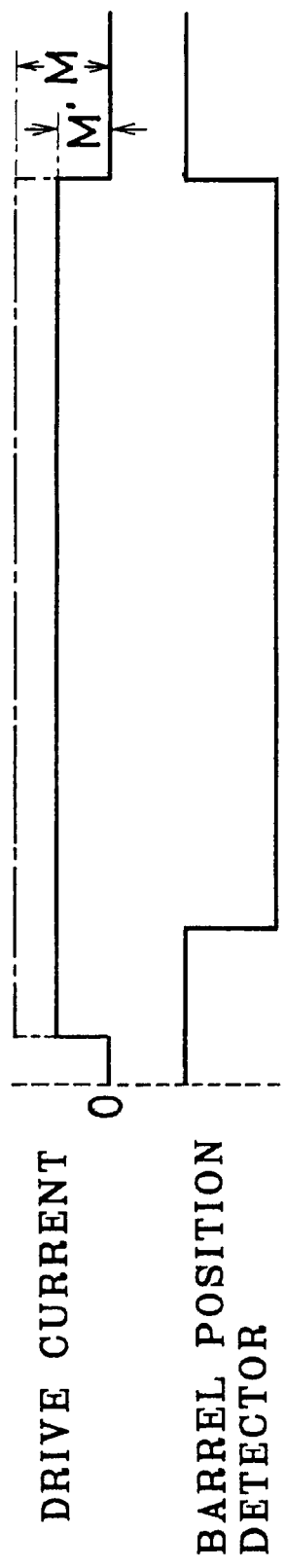
FIG. 29 shows timing charts illustrating a positive drive current supplied to the motor for driving the lens barrel mechanism according to another embodiment.
Figure 30:
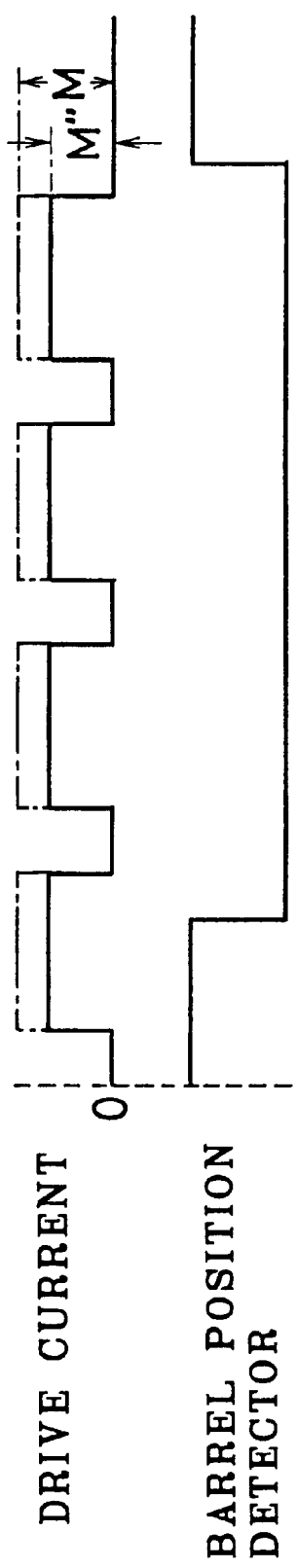
FIG. 30 shows timing charts illustrating a positive drive current supplied to the motor for driving the lens barrel mechanism according to still another embodiment.

Instead of supplying the positive drive current intermittently, it is possible to supply a positive drive current of a smaller magnitude M' continuously to the motor 94 than the magnitude M of the negative drive current, as shown in FIG. 29. To reduce the electric power supplied per unit time to the motor 94 in the first direction, it is also possible to supply a positive drive current of a smaller magnitude M" intermittently to the motor 94 for driving the lens barrel mechanism, as shown in FIG. 30. In FIGS. 29 and 30, the magnitude M of the negative drive current for rotating the motor 94 in the second direction to drive the film feed out mechanism is shown for comparison.

Figure 31:
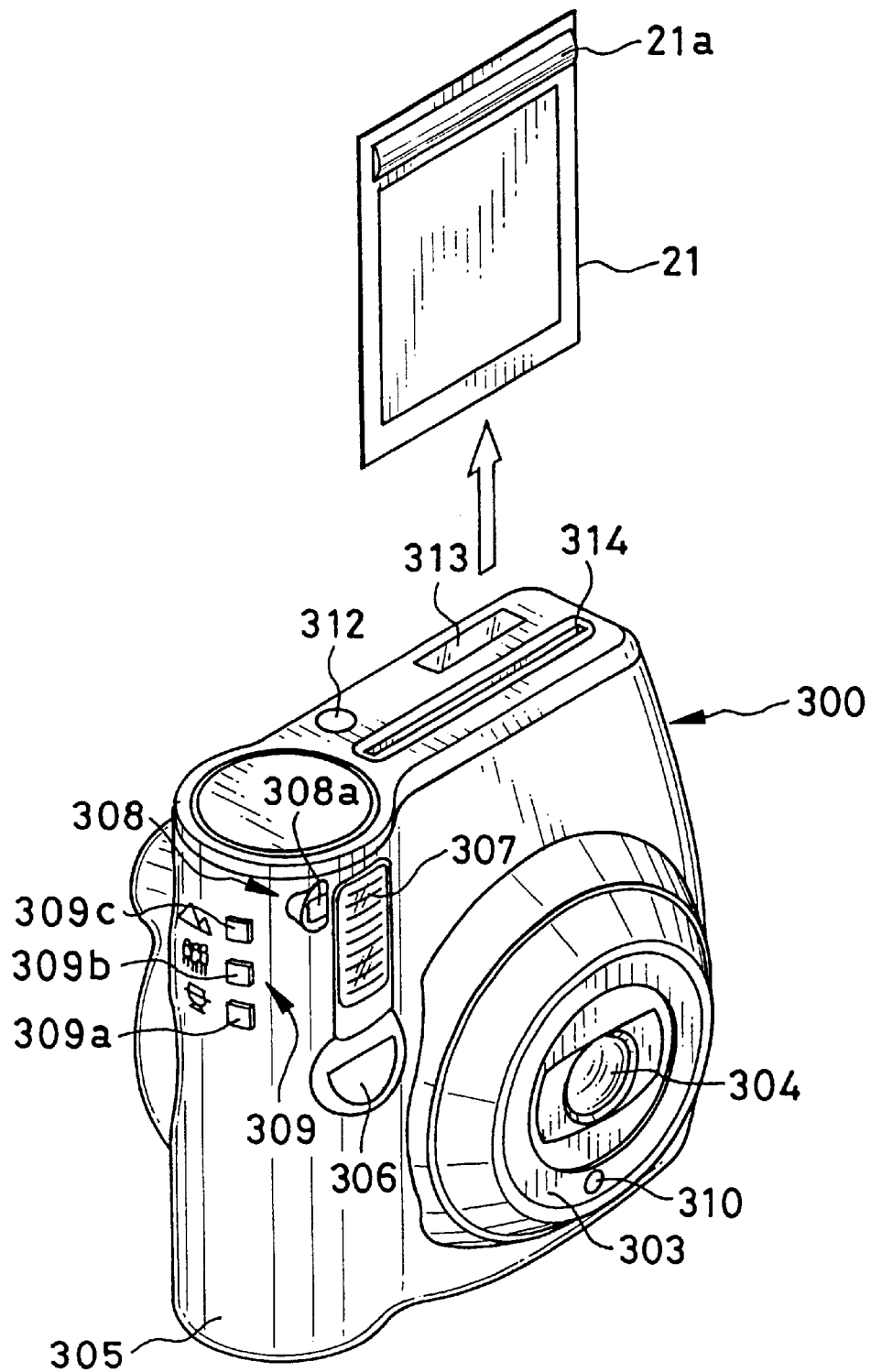
FIG. 31 is a perspective view of an instant camera according to another embodiment of the invention, which is provided with a manually operated zone selecting device for selecting one of three subject distance zones to focus.

FIG. 31 shows an instant camera 300 according to a further embodiment of the invention. A lens barrel 303 holding a taking lens 304 therein is mounted on a front of a camera body 302. The lens barrel 303 is movable between a stowed position and a protruded photographic position. A shutter button 306 is mounted on a grip portion 305, and a flash projector 307, an objective window 308a of a viewfinder 308 are located above the shutter button 306. There is also a zone selector 309 of a zone focusing device for selecting a subject distance zone to be focused on by the taking lens 304 from among predetermined subject distance zones. A light measurement window 310 is provided on a front surface of the lens barrel 303. A power switch 312, an LCD 313 and a film exit 314 are provided on a top side of the camera body 302. When the power switch 312 is turned on, the instant camera 300 is activated and the lens barrel 303 moves to the photographic position. When the power switch 312 is turned off, the lens barrel 303 retracts to the stowed position, and the instant camera 300 is deactivated.

The taking lens 304 is of zone focusing type. In the present embodiment, the subject distance is divided into three zones: near, middle and far distance zones, and the photographer selects one of the three zones by the zone selector 309 before exposure. According to the selected zone, the taking lens 304 is set at one of predetermined focusing positions: a near distance focusing position, a middle distance focusing position and a far distance focusing positions.

For example, the near distance zone ranges from 0.7 m to 1.3 m, the middle distance zone from 1.3 m to 3 m, and the far distance zone from 2.5 m to infinity. When the near distance zone is selected, the taking lens 304 is focused on a subject distance of 1.0 m, wherein any subject at 0.7 m to 1.3 m is included in the depth of field of the taking lens 304. When the middle distance zone is selected, the taking lens 304 is focused on a subject distance of 1.8 m, wherein any subject at 1.3 m to 3.0 m is included in the depth of field. When the far distance range is selected, the taking lens 304 is focused at its hyper-focal distance, e.g. at 5.0 m, wherein any subject at 2.5 m to infinity is included in the depth of field.

Corresponding to the selectable three subject distance zones, the zone selector 309 has three push button switches 309a, 309b and 309c, and the photographer pushes one of these push button switches 309a, 309b and 309c for selecting one subject distance zone.

A pair of developing rollers 27 (see FIG. 32) are provided behind the film exit 314, to feed out an exposed instant film unit 21 through the film exit 314. Designated by 21a is a developing solution pod of the instant film unit 21.

Figure 32:
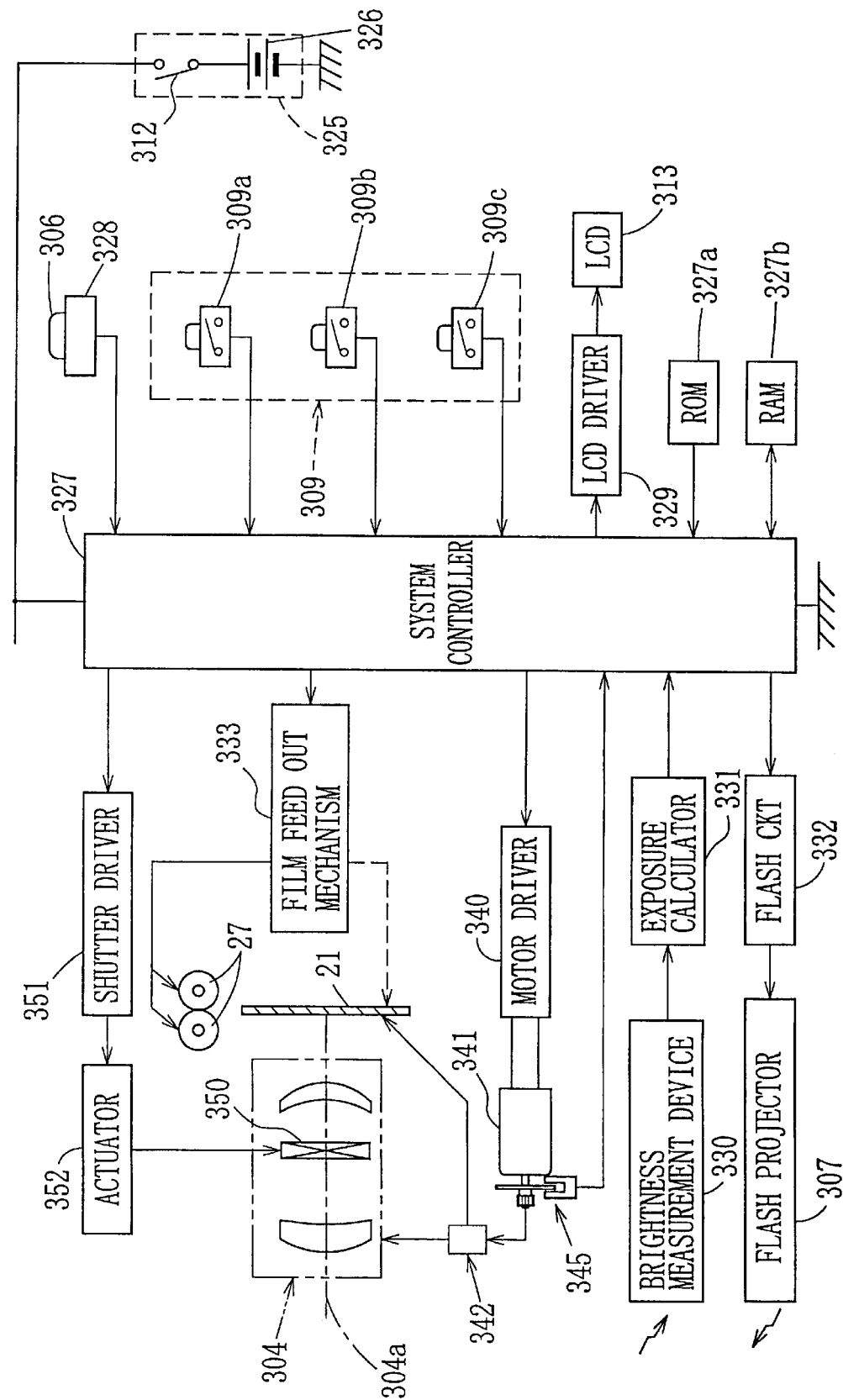
FIG. 32 is a block diagram illustrating a circuitry and a lens barrel mechanism of the instant camera of FIG. 31.

FIG. 32 shows a circuitry of the instant camera 300. A power source circuit 325 consists of the power switch 312 and a battery 326. When the power switch 312 is turned on, electric power is supplied from the battery 326 to other electric elements of the instant camera 300. A system controller 327 monitors the switching condition of the power switch 312, and controls operation of the instant camera 300 in accordance with a sequence program stored in ROM 327a. The ROM 327a also stores data necessary for executing the program. RAM 327b is used as a work memory for temporally storing data and parameter during execution of the program.

The push button switches 309a, 309b and 309c of the zone selector 309 are connected to the system controller 327 through lead wires or flexible substrates. The push button switch 309a outputs a near distance zone selection signal to the system controller 327 when it is turned on. The push button switch 309b outputs a middle distance zone selection signal to the system controller 327 when it is turned on. The push button switch 309c outputs a far distance zone selection signal to the system controller 327 when it is turned on.

Because the zone selector 309 and the system controller 327 may be connected through lead wires or flexible substrate, the push button switches 309a to 309c may be located at appropriate positions on the camera body so as to facilitate handling the instant camera 300 and improve the appearance of the instant camera 300. In this embodiment, for example, the zone selector 309 is located near the shutter button 306, so the photographer can operate the zone selector 309 by shifting a finger a little from the shutter button. Since lead wires or flexible substrate needs a small mounting space, the instant camera 300 may be designed to be more compact and small.

An LCD driver 329 drives the LCD 313 to display information necessary for photography, such as the number of exposed instant film units and the presently selected zone, under the control of the system controller 327.

A release signal generator 328 is connected to the shutter button 306, for generating a release signal to the system controller 327 when the shutter button 306 is pressed. A brightness measurement device 330 is located behind the light measuring window 310, and is activated when the release signal is entered. Based on a subject brightness measured by the brightness measurement device 330, an exposure calculator 331 determines an exposure value consisting of a shutter speed and an aperture size, and also determines whether the flash projector 307 should fire or not. The results of the exposure calculator 331 are sent to the system controller 327. A flash circuit 332 starts charging automatically upon the power switch 312 being turned on. If the exposure calculator 331 determines that the flash projector 307 should fire, the flash circuit 332 causes the flash projector 307 to fire synchronously with the exposure.

A film feed out mechanism 333 includes the developing rollers 27 and a claw mechanism like as shown in FIG. 25. After each instant film unit 21 is exposed, the system controller 327 drives the film feed out mechanism 333 to feed out the exposed instant film unit 21 through the developing rollers 27 and the film exit 314.

The taking lens 304 is movable between a stowed rest position, the near distance focusing position, the middle distance focusing position and the far distance focusing position by rotating the lens barrel 303 in one direction. The lens barrel 303 may preferably have the same construction as shown in FIG. 21. To rotate the lens barrel 303 in one direction, the lens barrel 303 is coupled to a motor 341 through a clutch mechanism 342 that transmits rotational power of the motor 341 either to the lens barrel 303 or to the film feed out mechanism 333 according to the rotational direction of the motor 341.

A rotary encoder 345 is provided for detecting rotational position of the focusing motor 341, and thus axial position of the taking lens 304. The rotary encoder 345 outputs an encode pulse to the system controller 327 each time the motor 341 rotates through a predetermined angle. The system controller 327 monitors the axial position of the taking lens 304 by counting the encoder pulses, and controls the focusing motor 341 through a motor driver 340 so as to set the taking lens 304 at one of the predetermined focusing positions in correspondence with the subject distance zone selected through the zone selector 309.

A between-lens shutter 350 provided in the taking lens 304 constitutes a program shutter that doubles as shutter blades and a stop diaphragm. When the release signal is entered, the system controller 327 sends an exposure value determined by the exposure calculator 331 to a shutter driver 351. Then, the shutter driver 351 drives an actuator 352 to open and close the shutter 350 at a shutter speed and with an aperture size given by the exposure value.

Now the operation of the instant camera 300 will be described with reference to FIG. 33.

When the power switch 312 is turned on, the lens barrel 303 is protruded out to the photographic position. Simultaneously, the motor 341 is driven to set the taking lens 304 to the middle distance focusing position regardless of which subject distance zone has been selected before the power switch 312 is turned on. Thereafter, the photographer selects one of the predetermined subject distance zones by operating one of the push button switches 309a, 309b and 309c depending upon the subject to photograph.

Since the taking lens 304 is initially set to the middle distance focusing position just by turning on the power switch 312, if the middle distance zone is to be selected, the photographer needs not operate any push button switches 309a to 309c to take a photograph. Because the majority of photographic subjects are located in the middle distance zone of 1.3 m to 3 m, setting the default position of the taking lens 304 to the middle distance focusing position is convenient in most cases. Moreover, even if the photographer forgets to select the subject distance zone, the focusing conditions of most photographs will not be lowered.

If the push button switch 309c is pressed to select the far distance zone, a far distance zone selection signal is fed to the system controller 327, so the system controller 327 drives the motor 341 through the motor driver 340 to set the taking lens 304 to the far distance focusing position. If the push button switch 309a is pressed to select the near distance zone, a near distance zone selection signal is fed to the system controller 327, so the system controller 327 drives the motor 341 to set the taking lens 304 to the near distance focusing position. If the push button switch 309b is pressed to select the middle distance zone after operating the push button switch 309a or 309c, a middle distance zone selection signal is fed to the system controller 327, so the taking lens 304 is reset to the middle distance focusing position. In this way, the position of the taking lens 304 can be changed any time by operating the zone selector 309. The LCD 313 displays the presently selected distance zone, for photographer's confirmation. It is possible to display the mark indicating the presently selected distance zone in the viewfinder 308.

After selecting an appropriate one of the three subject distance zones, the photographer presses the shutter button 306. Then, the release signal generator 328 outputs a release signal to the system controller 327, which then activates the brightness measurement device 330, and sends an exposure value determined based on the subject brightness to the shutter driver 351. As a result, the shutter 350 opens and closes to expose the instant film unit 21 in accordance with the exposure value. If necessary, the flash projector 307 is activated to project a strobe of light toward the subject while the shutter 350 opens. It is possible to reduce the amount of light projected from the flash projector 307 when the near distance zone is selected, in order to prevent over-exposure. It is also possible to stop the flash projector 307 from flashing when the far distance zone is selected, and determine the exposure value to be suitable for the non-flash photography instead.

After the exposure, the motor 341 is driven reversely through the motor driver 340, to drive the film feed out mechanism 333 to feed out the exposed instant film unit 21 through the film exit 313. While the exposed instant film unit 21 squeezes through the developing rollers 27, the developing solution pod 21a is broken to spread the developing solution over the instant film, developing a positive photographic image of the subject in a few minutes. When the power switch 312 is turned off, the system controller 327 drives the motor 341 to retract the lens barrel 303 into the stowed rest position.

Although the above embodiment divides the subject distance into three zones, if the hyper-focal distance of the taking lens is relatively short, it is possible to take photographs in satisfactory focusing conditions at any subject distance from a near distance to infinity just by providing two focusing positions while dividing the subject distance into two zones.

Figure 34:
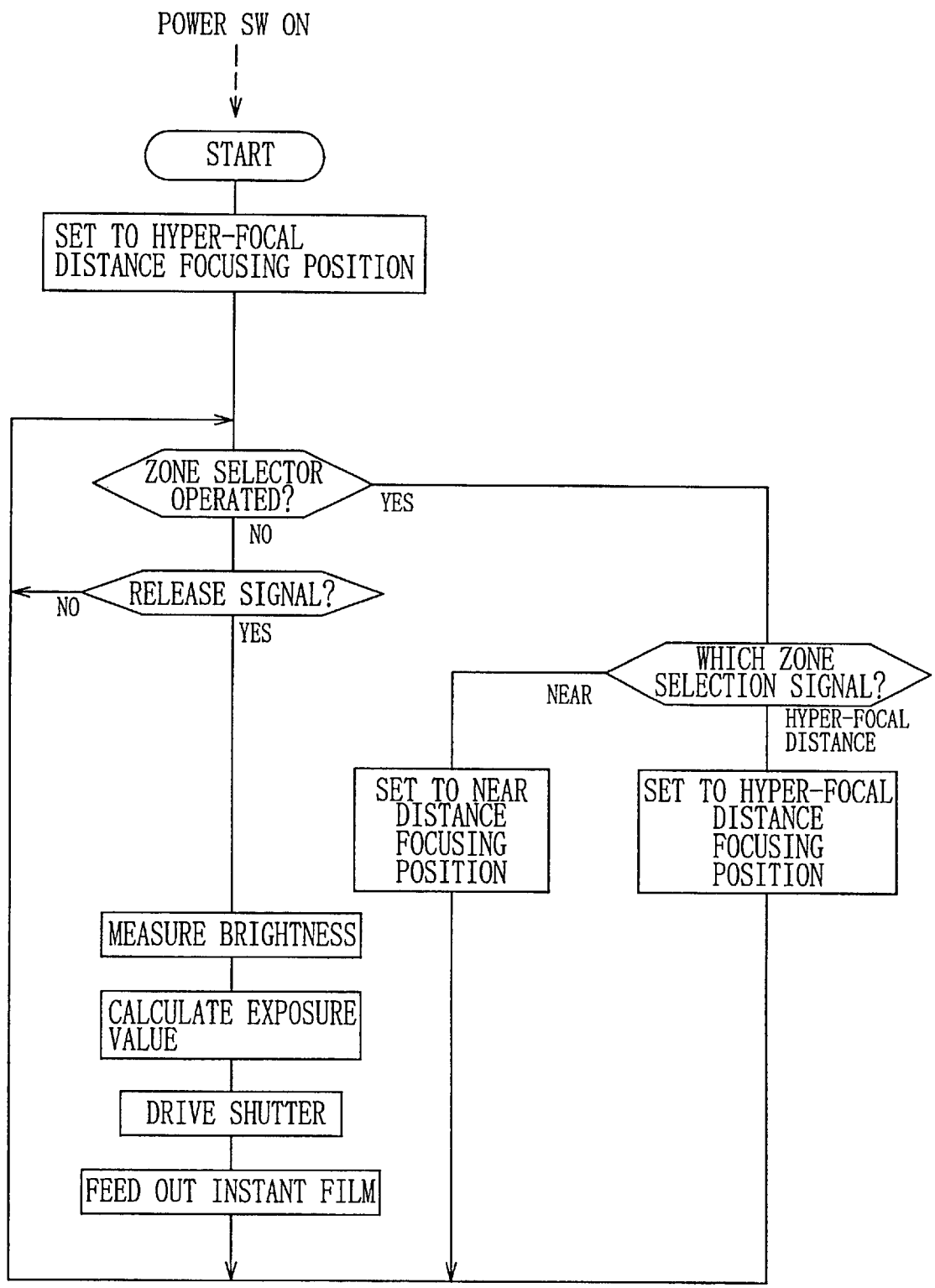
FIG. 34 is a flow chart illustrating an operation sequence for a camera that is set to one of two focusing positions in response to a zone selection signal entered through a zone selecting device.

FIG. 34 shows the sequence program for such an embodiment wherein the taking lens has a relatively short hyper-focal distance, e.g., 2.6 m, and is provided with two focusing positions for a near distance zone and a hyper-focal distance zone. Except that two push button switches for the near distance zone and the hyper-focal distance zone are provided as a zone selecting device, this embodiment may have the same construction as shown in FIGS. 31 and 32, so the following description relates only to those features essential for this embodiment.

At the near distance focusing position for the near distance zone, the taking lens is focused on a subject distance of 0.8 m, and includes any subject from about 0.6 m to 1.3 m in its depth of field. At the hyper-focal distance focusing position for the hyper-focal distance zone, the taking lens is focused on the hyper-focal distance, so any subject from about 1.3 m to infinity is included in the depth of field.

Since the probability of taking photographs in the hyper-focal distance zone of 1.3 m to infinity is usually higher, the taking lens of this embodiment is initially set at the hyper-focal distance focusing position immediately after a power switch is turned on.

Figure 35:
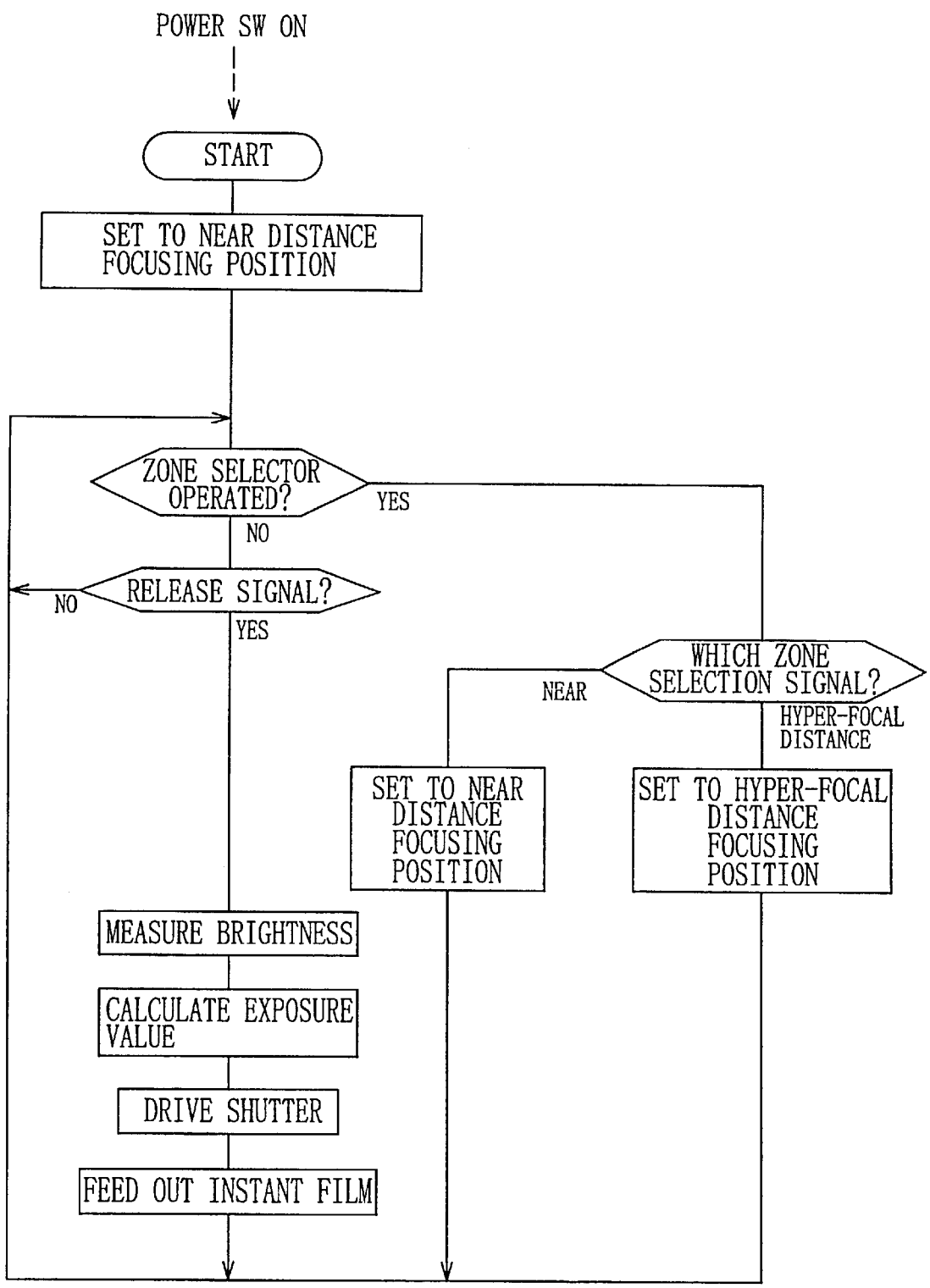
FIG. 35 is a flow chart illustrating another operation sequence for the camera having two focusing positions.

Since the photographs taken on the instant film are not usually enlarged, it is also desirable in view of the image magnification to set the taking lens initially to the near distance focusing position upon a power switch being turned on, as shown in FIG. 35.

In either case, it is preferable to construct a lens barrel such that the lens barrel brings the taking lens to the initial focusing position by rotating the smallest angle from a stowed position among other focusing positions where the axial position of the lens barrel is changed bi-directionally by rotating a motor only in one direction.

Although the taking lens 304 is set to the focusing position each time the zone selection signal is entered, it is possible to move the taking lens 304 to the focusing position in response to the release signal after the focusing position is selected through the zone selector 309. It is possible to reset the taking lens 304 to the initial focusing position after each exposure. It is also possible to customize an initial or default focusing position among the selectable focusing positions, so that the taking lens 304 is set to the initial focusing position designated by the customer.

Moreover, it is possible to divide the subject distance into more than three zones and provide more than three focusing positions correspondingly. Of course, ranges of the respective subject distance zones are not limited to the above mentioned values, but may be modified appropriately depending upon the optical characteristics of the taking lens.

Instead of providing a corresponding number of push button switches to the selectable subject distance zones, it is possible to provide a single operation member, e.g. a push button switch, as a zone selecting device such that the subject distance zone is switched over one after another in a cyclic fashion upon each operation on the operation member.

Where the taking lens does not have to be automatically set to an initial focusing position immediately after the power switch is turned on, it is possible to use a slide switch or a dial switch as the operation member of the zone selecting device.

Figure 33:
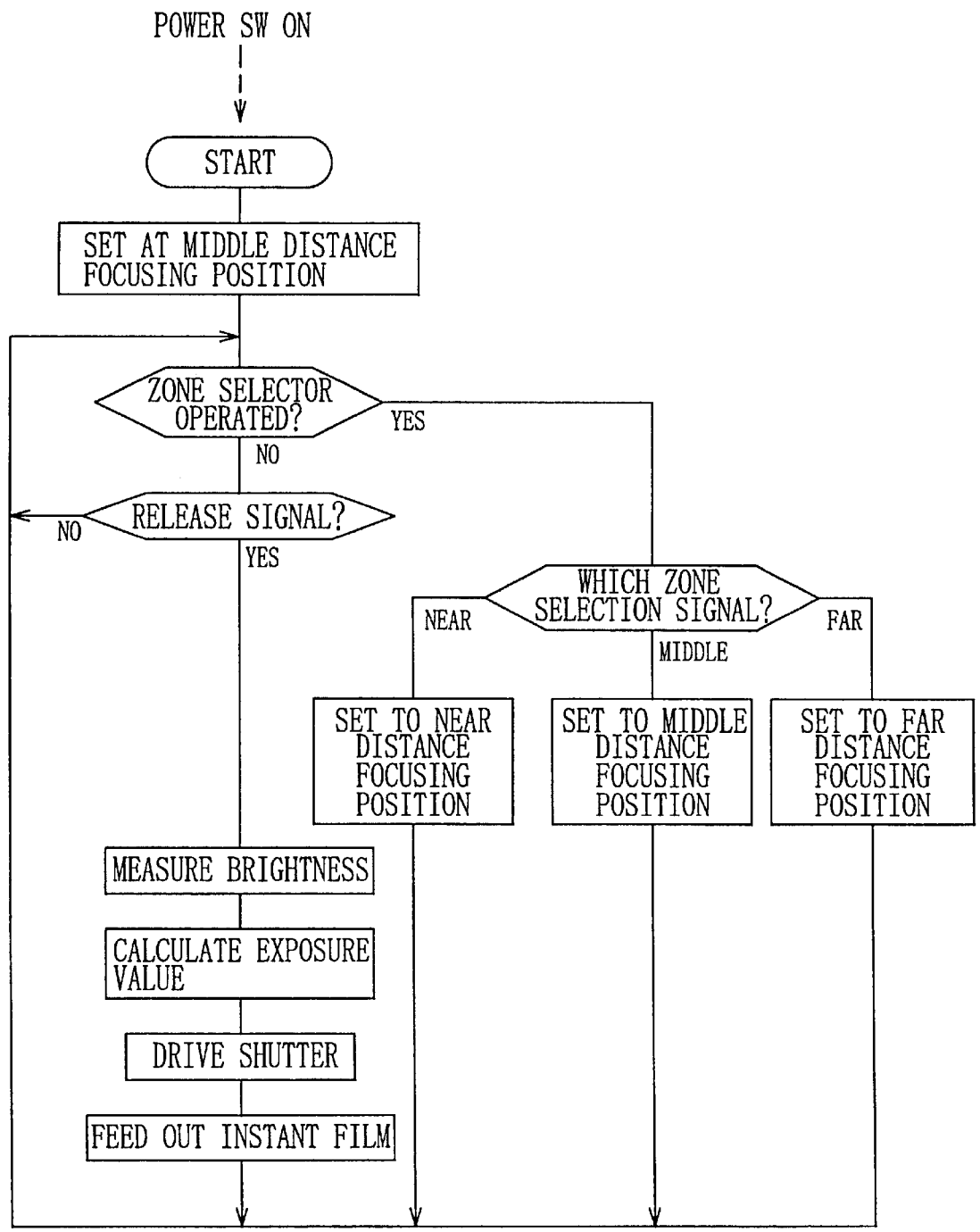
FIG. 33 is a flow chart illustrating an operation sequence of the instant camera of FIG. 31.

As for the zone selector 309 and the focusing method shown in FIGS. 33 to 35, the construction of the taking lens 304 is not limited to the above embodiment, but any lens barrel mechanism of the zone focusing type may be used insofar as it is driven by a motor. The taking lens may be such a type where a movable lens or lens group is moved relative to a stationary lens for focusing, or the whole lens system is moved for focusing. It is possible to provide a focusing motor independently of a motor used for driving the film feed out mechanism.

Although the power switch is turned on and off directly by the customer in the above embodiments, it is possible to turn on the power switch indirectly, for example, by manually opening a lens cover if the camera has a lens cover.

It is also possible to constitute the drive ring or cam barrel to be rotatable by hand to set the taking lens at one of different focusing positions provided in correspondence with different subject distance zones, instead of rotating it by the rotational power of the motor.

The present invention has been described with respect to the instant cameras shown in the drawings, the present invention is not only applicable to instant cameras, but also to 35 mm cameras, electric still cameras, and other type cameras.

Thus, the present invention is not to be limited to the above embodiments but, on the contrary, various modification may be possible to those skilled in the art without departing from the scope of appended claims.

What is claimed is:

1. A camera comprising:
   a zone selecting device for manually selecting one of a plurality of subject distance zones to be focused on by a taking lens, the zone selecting device outputting a zone selection signal representative of the one selected subject distance zone, and a control device for controlling a motor to set the taking lens at one of predetermined different focusing positions in accordance with the zone selection signal, wherein an initial focusing position is predetermined among the different focusing positions, and the control device sets the taking lens at the initial focusing position immediately after a power switch of the camera is turned on.

2. A camera as claimed in claim 1, wherein the initial focusing position is a focusing position where the taking lens is focused on its hyper-focal distance.

* * * * *